(12) United States Patent
Fernandez et al.

(10) Patent No.: US 11,346,934 B2
(45) Date of Patent: May 31, 2022

(54) AUTOMATIC RECEPTION WINDOW FOR GEO-LOCATING WLAN DEVICES

(71) Applicant: SR Technologies, Inc., Sunrise, FL (US)

(72) Inventors: Olivia Desiree Fernandez, Boca Raton, FL (US); Graham K Smith, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 270 days.

(21) Appl. No.: 16/875,288

(22) Filed: May 15, 2020

(65) Prior Publication Data

US 2021/0255308 A1    Aug. 19, 2021

Related U.S. Application Data

(60) Provisional application No. 62/976,789, filed on Feb. 14, 2020.

(51) Int. Cl.
*G01S 13/76* (2006.01)
*G01S 13/00* (2006.01)
*H04W 64/00* (2009.01)

(52) U.S. Cl.
CPC .......... *G01S 13/762* (2013.01); *G01S 13/006* (2013.01); *H04W 64/003* (2013.01)

(58) Field of Classification Search
CPC .. G01R 29/10; H04B 7/18502; H01Q 1/1257; G01S 7/4815; G01S 13/762; G01S 13/006; H04W 64/00; H04W 64/003; H04W 24/10
See application file for complete search history.

(56) References Cited

U.S. PATENT DOCUMENTS

| 5,454,019 A | * | 9/1995 | Migita | A61B 6/032 378/15 |
| 2013/0343053 A1 | * | 12/2013 | Holman | H04N 9/317 362/241 |
| 2019/0195998 A1 | * | 6/2019 | Campbell | G05D 1/0257 |
| 2020/0413267 A1 | * | 12/2020 | Xue | H04W 24/02 |
| 2021/0242921 A1 | * | 8/2021 | Thurfjell | H04B 7/0486 |

* cited by examiner

*Primary Examiner* — Gerald Johnson
(74) *Attorney, Agent, or Firm* — Christopher & Weisberg, P.A.

(57) ABSTRACT

A method for determining reception window timing using a measuring station receiving an antenna beam width, receiving an antenna tilt angle, receiving an altitude A, determining a far projection angle Δf, determining a near projection angle Δn, and determining a far projection range corresponding to the far projection angle Δf and based at least upon the values of Δf and A. The method further includes determining a near projection range corresponding to the near projection angle Δn and based at least upon the values of Δn and A, determining an end time of a reception window based at least upon the value of the far projection range the reception window being a window of time in which a response from the target station is expected to be received, and determining a start time of the reception window based at least upon the value of the near projection range.

23 Claims, 11 Drawing Sheets

AUTOMATIC RECEPTION WINDOW FOR GEO-LOCATING WLAN DEVICES

CROSS-REFERENCE TO RELATED APPLICATION

This application is based on and claims priority to U.S. Provisional Patent Application No. 62/976,789, entitled "AUTOMATIC RECEPTION WINDOW FOR GEO-LOCATING WLAN DEVICES, filed on Feb. 14, 2020, the entire contents of which is incorporated herein by reference.

TECHNICAL FIELD

The present disclosure relates to geo-location of wireless devices, and in particular to a method and system for the geo-location of wireless local area network (WLAN) devices.

BACKGROUND

Initially, it is noted that IEEE Standard 802.11-2016 is used as the base reference for disclosures used herein, the entire contents of which are incorporated herein by reference. The IEEE 802.11-2016 Standard is commonly referred to as "Wi-Fi" and is referred to as such herein.

Location of wireless devices can be determined by various methods. These methods may be classified as active, passive and combined active and passive. In an active location scheme, a device that is determining the location or range, the measuring device, transmits certain packets, referred to as "ranging packets", to a device being located, i.e., the target device. A common method is to measure the time of arrival (TOA) of a response packet from the target device and compare that to a time of departure (TOD) of the ranging packet that was transmitted by the measuring device so as to determine the round trip time (RTT).

In an active location scheme, the TOD may be measured for a ranging packet that is transmitted from the measuring station addressed to the target station. The TOA of the response from the target station at the measuring station is then also measured. If the turnaround time for the target station to receive the packet from the measuring station and to start to transmit the response is known, or is known to be a constant, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, the response from the target station will normally be an acknowledgement (ACK) packet. If the packet transmitted from the measuring station to the target station is a control packet, for example, a request-to-send (RTS) packet, then the response from the target station will normally be a clear-to-send (CTS) packet. In these two examples, the turnaround time at the target station is defined in the IEEE 802.11 standard as the short interframe spacing (SIFS), which is a preset value. Hence, the time delay (td) between the measuring station and the target station, may be determined from the calculation td=(TOA−TOD−SIFS)/2, and the distance between the measuring station and the target station is then td*c, where c is the speed of light. This method of estimating the distance to a target station by measuring the TOD and TOA and accounting for the turnaround time is known.

FIG. 1 is a diagram of a typical location system 100 which includes three measuring stations 110a, 110b and 110c (referred to collectively herein as "measuring stations" or "measuring receivers" 110). The target station 120 may be a wireless device, such as, for example, an Access Point (AP) that is to be located by the three measuring stations 110. The distance of the target station 120 from measuring station 110a is D1 130. The distance of the target station 120 from measuring station 110b is D2 140. The distance of the target station 120 from measuring station 110c is D3, 150. The round trip time, RTT1, determined from the calculation RTT=(TOA−TOD−SIFS), is measured for transmissions from measuring station 110a and this can used to calculate the distance D1 130 using the formula D1=RTT1*c/2 where c is the speed of light. Similarly, RTT2 and RTT3 measurements result in the determination of distances D2 140 and D3 150. The methods for calculating the location of target station 120 using the distances D1 130, D2 140 and D3 150 are well known.

FIG. 2 is a diagram of a location system where an airborne measuring station 110 is used. The airborne measuring station 110 is depicted being flown in a circular orbit 200 around a target station 120. The distance of the target station 120 from the measuring station 110, when the measuring station 110 is at position A 201, is D4 210. The distance of the target station 120 from the measuring station 110, when the measuring station 110 is at position B 202, is D5 211. The distance of the target station 120 from the measuring station 110, when the measuring station 110 is at position C 203, is D6 212. Unless the target station 120 is positioned at the center of the orbit 200, the distances D4 210, D5 211, and D6 212 will not be equal. An operator may identify an area of interest 220 within which the target station 120 may be expected to be positioned, and hence may point a directional antenna in the airborne station 110 in the direction of that area 220.

A reception window may be defined as the start and end times after the end of the transmission of each ranging signal. A reception window restricts the time that the measuring station 120 listens for the response signal. When using certain methods to detect the response signals, it is possible to falsely detect spurious signals as the response signal, and the use of a reception window may reduce the number of false detections and improve the overall performance.

The timing of the reception window may be related to distance of an area of interest 220 within which the target station 120 may be expected to be positioned. The values for the reception window may be entered by an operator based upon advanced knowledge of an area of interest 220 related to the expected range to the target device 120, but, as discussed above with reference to FIG. 2, in the general sense, the range to the target device 120 may not be constant and may vary as the airborne measuring station 110 orbits the target station 120. Furthermore, as the measuring station 110 is airborne at a certain altitude, the slant ranges from the airborne measuring station to the area of interest 220 are required which would require updated information on the altitude of the airborne measuring station 110.

FIG. 3 is an exemplary plot of the gain of a typical directional antenna. The antenna vertical gain plot 310 is displayed in dBs against direction. The plot is shown in polar form with the direction angle 320 and the maximum gain axis 330. In this example, the maximum gain 300 is shown at the direction 90 degrees. In this example at about 110 degrees 340 the gain is at −3 db compared to the maximum gain 300 at 90 degrees. Similarly, at about 70 degrees 350 the gain is also at −3 db compared to the maximum gain 300 at 90 degrees. Hence the vertical beam width for this example antenna is about 40 degrees. Also, in this example, at about 122 degrees 345 the gain is at −12 db compared to the maximum gain 300 at 90 degrees and, at about 58 degrees 355 the gain is also at −12 db compared to the maximum gain 300 at 90 degrees. Hence the vertical −12 dB beam width for this example antenna is about 64 degrees. Such a directional antenna may be used in the airborne measuring station 110. Furthermore, such a directional antenna may be mounted in a gimballed system such that it may be continuously pointed at the area of interest 220.

A classic method to represent the relative gain of a directional antenna with angle, based upon the number of elements in the array, is the following equation:

$$\text{AntGain} = \sin(nx)/n \sin(x) \quad (1)$$

where n is the number of elements, and x is the angle from the center or boresight, where x=0 at the boresight of the antenna. The solving of equation (1) for any particular beam width can be expressed in terms of Euler's equation and binomial coefficients but, in order to simplify the calculations, it is common to use an approximation of De Moivre's theorem, as per the following equation:

$$\text{AntGain} = \cos^N(x) \quad (2)$$

where x is the angle from the center or boresight, and N can be calculated for any given beam width.

Using equation (2), at boresight x=0, AntGain=1, and the 3 dB beam width, at angles±Φ, is determined when AntGain=0.5, hence:

$$\cos^N \Phi = 0.5$$

$$\text{Or } N \text{ Log}(\cos \Phi) = \text{Log}(0.5)$$

$$N = \text{Log}(0.5)/\text{Log}(\cos \Phi) \quad (3)$$

where the antenna beam width is 2Φ. For example, for a beam width of ±10 degrees, Φ=10, N calculates to be 45.28. Table 1 shows the values for N for half beam widths, Φ, varying from 10 to 45 degrees.

TABLE 1

| BW/2, Φ | N |
|---|---|
| 10 | 45.28 |
| 15 | 19.99 |
| 20 | 11.14 |
| 25 | 7.05 |
| 30 | 4.82 |
| 35 | 3.47 |
| 40 | 2.60 |
| 45 | 2.00 |

SUMMARY

The present disclosure advantageously provides a method, an apparatus and a measuring station for the geolocation of wireless local area network (WLAN) devices.

In one aspect of the disclosure, a method for determining reception window timing using a measuring station is provided. The measuring station includes a directional antenna having a boresight and transmits signals to a target station. In addition, the measuring station receives response signals from the target station corresponding to the transmitted signals. The method includes receiving an antenna beam width 2Φ, receiving an antenna tilt angle θ, and receiving an altitude A, where A is an altitude of the measuring station above ground level. A far projection angle Δf is determined based at least upon a far signal strength at ground level. The far signal strength is a far predetermined fraction of a maximum signal strength at ground level, and the far predetermined fraction is based at least in part upon the beam width 2Φ and tilt angle θ. A near projection angle Δn is determined based at least upon a near signal strength at ground level. The near signal strength is a near predetermined fraction of the maximum signal strength at ground level, and the near predetermined fraction is based upon the beam width 2Φ and tilt angle θ. In addition, the method includes determining a far projection range, Rf, corresponding to the far projection angle Δf and based at least upon the values of Δf and A. A near projection range, Rn, corresponding to the near projection angle Δn and based at least upon the values of Δn and A is determined. An end time of a reception window, Tt, is determined based at least upon the value of the far projection range, Rf. The reception window is a window of time in which a response from the target station is expected to be received. The method further includes determining a start time of the reception window based at least upon the value of the near projection range, Rn.

In some embodiments of this aspect, the far projection angle Δf is determined from a formula given by $(\sin^2(\Delta f) \cos^N(\psi))/(\sin^2(\theta+\psi\text{max})\cos^N(\psi\text{max}))=\text{Fraction}$, where (ψ) is a deviation in degrees from the boresight of the directional antenna, (ψmax) is a deviation from the boresight of the directional antenna that corresponds to a maximum gain at the ground level, (θ+ψ) being a pitch angle, (θ+ψmax) is the pitch angle of the maximum antenna gain at the ground level, $\cos^N(x)$ is an antenna gain at angle x, x is an angle from one of a center of the directional antenna and the boresight of the directional antenna, and Fraction is a predetermined fraction.

In some embodiments of this aspect, the near projection angle Δn is determined from a formula given by $(\sin^2(\Delta n) \cos^N(\psi))/(\sin^2(\theta+\psi\text{max})\cos^N(\psi\text{max}))=\text{Fraction}$, where (ψ) is a deviation in degrees from the boresight of the directional antenna, (ψmax) is a deviation from the boresight of the directional antenna that corresponds to a maximum gain at the ground level, (θ+ψ) is a pitch angle, (θ+ψmax) is the pitch angle of the maximum antenna gain at the ground level, $\cos^N(x)$ is an antenna gain at angle x, x is an angle from one of a center of the directional antenna and the boresight of the directional antenna, and Fraction is a predetermined fraction.

In some embodiments of this aspect, the near predetermined fraction of the maximum signal strength at the ground level is 1/15.8, and the far predetermined fraction of the maximum signal strength at the ground level is 1/15.8. In another embodiment of this aspect, the far projection angle Δf is determined as $\Delta f = (-14.83+1.08\Phi-0.013\Phi^2)+(1.11-0.061\Phi+0.00085\Phi^2)\theta+(0.00069+0.00028\Phi-0.0000057\Phi^2)\theta^2$, where 2Φ is a beam width of the directional antenna. In some embodiments of this aspect, the near projection angle Δn is determined as $\Delta n = (-6.35+3.48\Phi-0.034\Phi^2)+(1.04-0.019\Phi+0.0004\Phi^2)\theta+(0.000156+0.000062\Phi-0.0000027\Phi^2)\theta^2$, where 2Φ is a beam width of the directional antenna.

In some embodiments of this aspect, the far projection range Rf is determined as:

$$R_f = \begin{cases} \Delta_f = 0°, R_{fmax} \\ \dfrac{A}{\sin(\Delta_f)} > R_{fmax}, R_{fmax}, \\ \dfrac{A}{\sin(\Delta_f)} \end{cases}$$

where $\Delta_f = \begin{cases} \Delta_f < 0°, 0° \\ \Delta_f < \theta, \theta \end{cases}$, Rfmax being a maximum value for Rf derived from the time between successive transmitted ranging packets.

In some embodiments of this aspect, the near projection range Rn is determined as:

$$R_n = \begin{cases} \Delta_n > 90°, A \\ \dfrac{A}{\sin(\Delta_n)} \end{cases}.$$

In some embodiments of this aspect, the reception window end time Tt is determined as:

$$T_t = \begin{cases} \Delta_f = 0°, T_{tmax} \\ \dfrac{2R_f}{c} + t_{SIFS} > T_{tmax}, T_{tmax}, \\ \dfrac{2R_f}{c} + t_{SIFS} \end{cases}$$

$T_{tmax}$ is a maximum value for Tt derived from a time between successive transmitted ranging packets, and $t_{SIFS}$ being a short interframe spacing time.

In some embodiments of this aspect, the maximum value for the reception window end time, $T_{tmax}$ is determined as $T_{tmax}$=(Tp−tp−tr), where Tp is the time between transmitted request packets, tp is the duration of the request packet, and tr is the duration of the response packet. In some embodiments of this aspect, a maximum value of the far projection range, Rfmax, is determined as Rfmax=c(Ttmax−$t_{SIFS}$)/2, where c=speed of light, $T_{tmax}$ is a maximum value for Tt, and $t_{SIFS}$ being the short interframe spacing time. In some embodiments of this aspect, a reception window start time Ts, is determined as:

$$T_s = \begin{cases} \Delta_n > 90°, \dfrac{2A}{c} + t_{SIFS} \\ \dfrac{2R_n}{c} + t_{SIFS} \end{cases},$$

where Rn=A/sin (Δn), c=speed of light, and $t_{SIFS}$ being the short interframe spacing time.

In another aspect of the disclosure, an apparatus for determining reception window timing using a measuring station is provided. The measuring station includes a directional antenna having a boresight and transmits signals to a target station. The measuring station receives response signals from the target station corresponding to the transmitted signals. The apparatus includes processing circuitry in communication with the apparatus. The processing circuitry is configured to receive an antenna beam width 2Φ, receive an antenna tilt angle θ, and receive an altitude A, where A is the altitude of the measuring station above ground level. The processing circuitry is further configured to determine a far projection angle Δf based at least upon a far signal strength at ground level, where the far signal strength is a far predetermined fraction of a maximum signal strength at ground level, and the far predetermined fraction is based at least in part upon the beam width 2Φ and tilt angle θ. In addition, the processing circuitry is configured to determine a near projection angle Δn based at least upon a near signal strength at ground level, where the near signal strength is a near predetermined fraction of the maximum signal strength at ground level, and the near predetermined fraction is based upon the beam width 2Φ and tilt angle θ. The processing circuitry is further configured to determine a far projection range, Rf, corresponding to the far projection angle Δf and based upon the values of Δf and A, and determine a near projection range, Rn, corresponding to the near projection angle Δn and based at least upon the values of Δn and A. Additionally, the processing circuitry is configured to determine an end time of a reception window, Tt, based at least upon the value of the far projection range, Rf, where the reception window is a window of time in which a response from the target station is expected to be received. The processing circuitry is further configured to and determine a start time of the reception window based at least upon the value of the near projection range, Rn.

In some embodiments of this aspect, the far projection angle Δf is determined from the formula $(\sin^2(\Delta f)\cos^N(\psi))/(\sin^2(\theta+\psi max)\cos^N(\psi max))$=Fraction, where (ψ) is a deviation in degrees from the boresight of the directional antenna, (ψmax) is a deviation from the boresight of the directional antenna that corresponds to a maximum gain at the ground level, (θ+ψ) is a pitch angle, (θ+ψmax) is the pitch angle of the maximum antenna gain at the ground level, $\cos^N(x)$ is an antenna gain at angle x, x being an angle from one of a center of the directional antenna and the boresight of the directional antenna, and Fraction is a predetermined fraction.

In some embodiments of this aspect, the near projection angle Δn is determined from the formula $(\sin^2(\Delta n)\cos^N(\psi))/(\sin^2(\theta+\psi max)\cos^N(\psi max))$=Fraction, where (ψ) is a deviation in degrees from the boresight of the directional antenna, (ψmax) is a deviation from the boresight of the directional antenna that corresponds to a maximum gain at the ground level, (θ+ψ) is a pitch angle, (θ+ψmax) is the pitch angle of the maximum antenna gain at the ground level, $\cos^N(x)$ is an antenna gain at angle x, x is an angle from one of a center of the directional antenna and the boresight of the directional antenna, and Fraction is a predetermined fraction.

In some embodiments of this aspect, the near predetermined fraction of the maximum signal strength at the ground level is 1/15.8, and the far predetermined fraction of the maximum signal strength at the ground level is 1/15.8. In some embodiments of this aspect, the far projection angle Δf is determined as Δf=(−14.83+1.08Φ−0.013Φ²)+(1.11−0.061Φ+0.00085Φ²)θ+(0.00069+0.00028Φ−0.0000057Φ²)θ², 2Φ being a beam width of the directional antenna. In some embodiments of this aspect, the near projection angle Δn is determined as Δn=(−6.35+3.48Φ−0.034Φ²)+(1.04−0.019Φ+0.0004Φ²)θ+(0.000156+0.000062Φ−0.0000027Φ²)θ², 2Φ is a beam width of the directional antenna.

In some embodiments of this aspect, the far projection range Rf is determined as:

$$R_f = \begin{cases} \Delta_f = 0°, & R_{fmax} \\ \dfrac{A}{\sin(\Delta_f)} > R_{fmax}, & R_{fmax}, \\ \dfrac{A}{\sin(\Delta_f)} & \end{cases}$$

$$\text{where } \Delta_f = \begin{cases} \Delta_f < 0°, & 0° \\ \Delta_f < \theta, & \theta \end{cases},$$

and Rfmax is a maximum value for Rf derived from the time between successive transmitted ranging packets.

In some embodiments of this aspect, the near projection range Rn is determined as:

$$R_n = \begin{cases} \Delta_n > 90°, & A \\ \dfrac{A}{\sin(\Delta_n)} & \end{cases}.$$

In some embodiments of this aspect, the reception window end time Tt, is determined as:

$$T_t = \begin{cases} \Delta_f = 0°, & T_{tmax} \\ \dfrac{2R_f}{c} + t_{SIFS} > T_{tmax}, & T_{tmax}, \\ \dfrac{2R_f}{c} + t_{SIFS} & \end{cases}$$

$$\text{where } \Delta_f = \begin{cases} \Delta_f < 0°, & 0° \\ \Delta_f < \theta, & \theta \end{cases},$$

$$Rf = A/\sin(\Delta f),$$

$$c = \text{speed of light,}$$

$T_{tmax}$ is a maximum value for Tt derived from a time between successive transmitted ranging packets, and $t_{SIFS}$ is a short interframe spacing time.

In some embodiments of this aspect, the reception window start time Ts, is determined as:

$$T_s = \begin{cases} \Delta_n > 90°, & \dfrac{2A}{c} + t_{SIFS} \\ \dfrac{2R_n}{c} + t_{SIFS} & \end{cases},$$

where Rn=A/sin (Δn), c=speed of light, and $t_{SIFS}$ is the short interframe spacing time.

In yet another aspect of the disclosure, a measuring station for determining reception window timing is provided. The measuring station includes a directional antenna in communication with a transmitter receiver. The measuring station includes the transmitter receiver that is configured to transmit radio frequency (RF) signals, including RF signals to a target station, and receive RF signals, including RF signals from a target station corresponding to the transmitted RF signals. The measuring station further includes a processing circuitry configured to receive an antenna beam width 2Φ, receive an antenna tilt angle θ, and receive an altitude A, where A is the altitude of the measuring station above ground level. The processing circuitry is further configured to determine a far projection angle Δf based at least upon a far signal strength at ground level, where the far signal strength is a far predetermined fraction of a maximum signal strength at ground level, and the far predetermined fraction is based at least in part upon the beam width 2Φ and tilt angle θ. In addition, the processing circuitry is configured to determine a near projection angle Δn based at least upon a near signal strength at ground level, where the near signal strength is a near predetermined fraction of the maximum signal strength at ground level, and the near predetermined fraction is based upon the beam width 2Φ and tilt angle θ. The processing circuitry is further configured to determine a far projection range, Rf, corresponding to the far projection angle Δf and based at least upon the values of Δf and A, and determine a near projection range, Rn, corresponding to the near projection angle Δn and based at least upon the values of Δn and A. Additionally, the processing circuitry is configured to determine an end time of a reception window, Tt, based at least upon the value of the far projection range, Rf, where the reception window is a window of time in which a response from the target station is expected to be received. The processing circuitry is further configured to determine a start time of the reception window based at least upon the value of the near projection range, Rn.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

As an initial matter, it is noted that this application incorporates U.S. patent application Ser. No. 16/358,051 by reference in its entirety. U.S. patent application Ser. No. 16/358,051 discloses a method and computer for pointing a beam of a directional antenna located in an airborne measuring station 110. A method includes determining an angle $\psi_{max}$, where $\psi_{max}+\theta$ is an angle for a projection of maximum signal strength on the ground, where $\psi_{max}$ is based on the beam width $2\phi$ and tilt angle $\theta$. The method further includes determining the effective ground −3 dB beam width.

A method and system are disclosed that determine the timing parameters of a reception window based upon the based upon the tilt angle and beam width of a directional antenna that is mounted in an airborne measuring station 110.

In some embodiments, the disclosed method applies to the reception of direct sequence spread spectrum (DSSS) acknowledgement (ACK) and clear-to-send (CTS) packets in response to data null and request-to-send (RTS) packets respectively, in the 2.4 GHz band.

Figure 4:
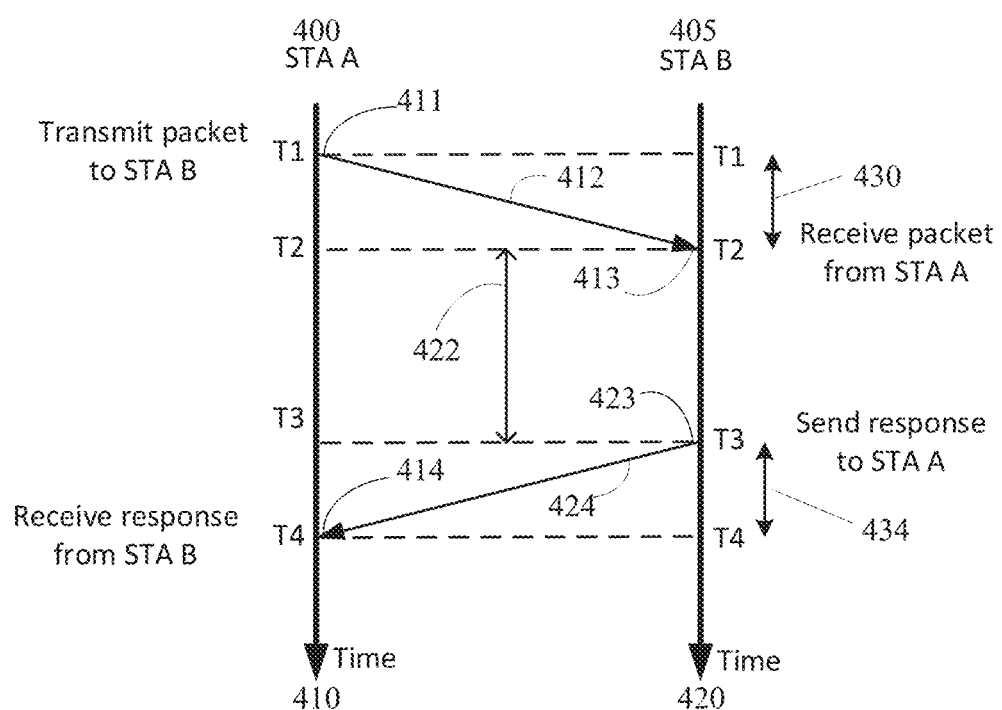
FIG. 4 is a timing diagram that describes a ranging method of the present disclosure that may be used to determine the distance between two wireless devices.

Referring again to the drawing figures in which like reference designators refer to like elements, FIG. 4 shows a timing diagram that describes a ranging method of the present disclosure that may be used to determine the distance between two wireless devices, for example wireless device STA A 400 and wireless device STA B 405. In one embodiment, one of the wireless devices (i.e., one of STA A 400 and STA B 405) may be target station 120. In another embodiment, at least one of wireless devices (i.e., at least one of STA A 400 and STA B 405) is measuring station 110. Time axis 410 refers to the time axis for STA A 400 and time axis 420 refers to the time axis for STA B 405. At time T1 411, STA A 400 transmits a packet to STA B 405. This ranging packet 412 transmission is received at STA B 405 at time T2 413. The propagation time of the ranging packet 412 transmission is (T2−T1) 430. STA B 405 transmits a response packet 424 at time T3 423. The time 422 that has elapsed between the reception of the ranging packet 412, at time T2 413, and the transmission of the response packet 424, at time T3 423, is the turnaround time at STA B 405. Ideally the turnaround time 422 at STA B will be equal in duration to SIFS. At time T4 414, STA A 400 receives the response packet 424 from STA B 405. The propagation time of the transmission 424 is (T4−T3) 434. It should be noted that the time differences 430 (T2−T1) and 434 (T4−T3) represent the propagation time, td, of the transmissions and should be equal assuming the distance between the two stations has not changed. The total time that elapses between the transmission 412 and the response 424 at STA A 400 is $$(T2-T1)+(T3-T2)+(T4-T3)=(T4-T1)=td+\text{SIFS}+td \quad (4)$$

Hence, $td=(T4-T1-\text{SIFS})/2$ \quad (5)

Expression (5) is a simplified equation that is included so as to provide the basic idea of the ranging transmission method. Note that the duration of the transmitted packet and the response packet is not accounted for in equation (5). Note that in practice it is common that the timestamp of a packet is set to coincide with the end of the packet at the point where the frame check is completed.

Figure 5:
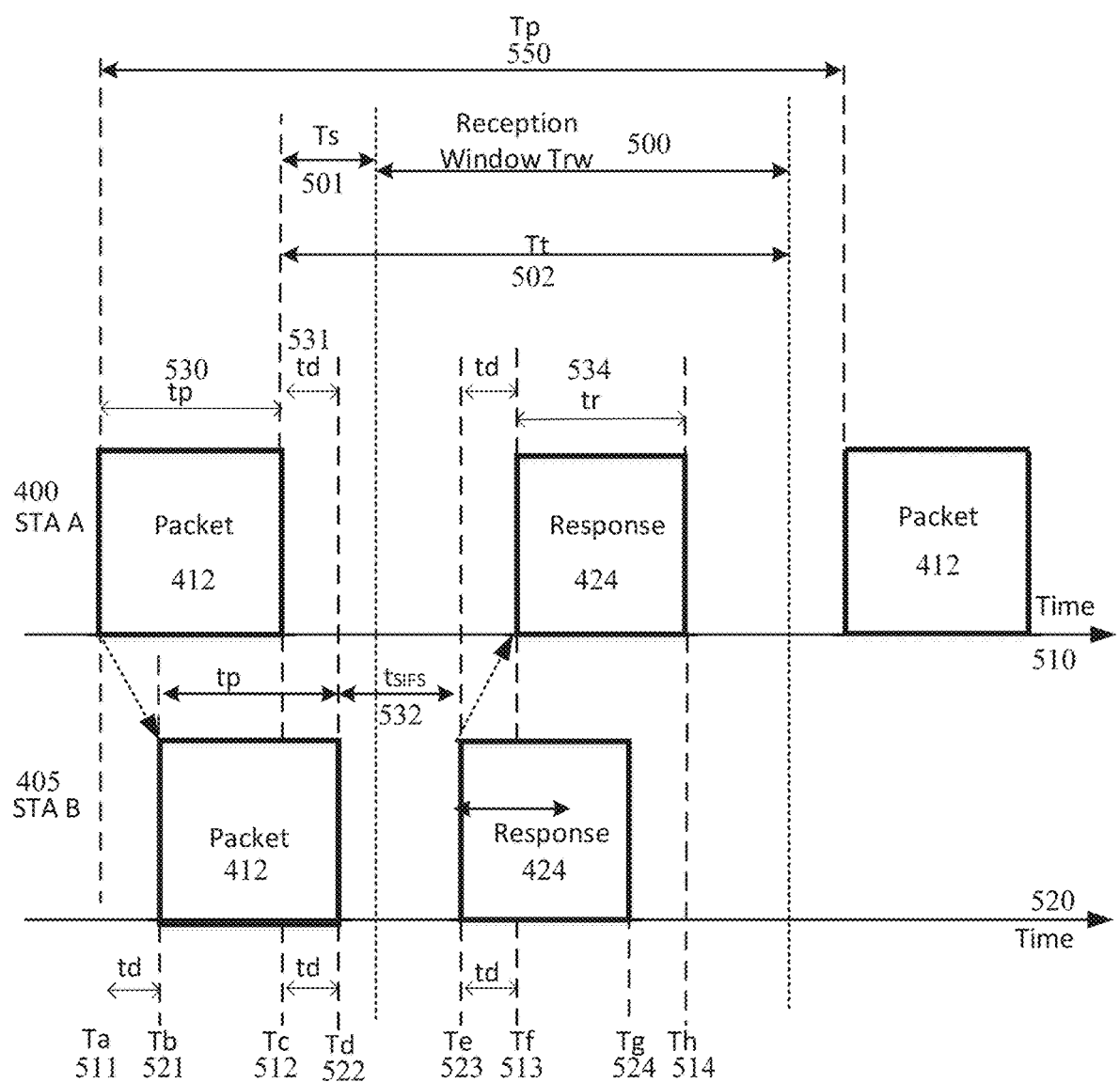
FIG. 5 is a timing diagram that describes in further detail the ranging transmission method.

FIG. 5 is a timing diagram that provides further details of the ranging transmission method disclosed herein. Time axis 510 is the time axis for STA A 400 and time axis 520 is the time axis for STA B 405. At time Ta 511, STA A 400 starts the transmission of ranging packet 412 which is addressed to STA B 405. After a time-delay of td, at time Tb 521, STA B 405 starts to receive ranging packet 412. At time Tc 512, STA A 400 completes the transmission of ranging packet 412 and at time Td 522, STA B 405 completes the reception of ranging packet 412. The time difference between Tc 512 and Td 522 is td, the propagation time for the packet to travel from STA A 400 to STA B 405. Note that the time differences (Tc−Ta) and (Td−Tb) are both the duration tp 530 of the transmitted ranging packet 412.

STA B 405 transmits the response packet 424 at time Te 523. Assuming that the response packet 424 is an ACK or an CTS packet in reply to the received ranging packet 412, time Te 523 ideally will be at a time $t_{SIFS}$ 532 after time Td 522, where $t_{SIFS}$ 532 is the SIFS time, for example as defined in the IEEE 802.11 standard. At time Tf 513, STA A 400 starts to receive the response packet 424. At time Tg 524, STA B 405 completes the transmission of the response packet 424 and at time Th 514, STA A 400 completes receiving the response packet 424. Note that the time differences (Tb−Ta), (Td−Tc), (Tf−Te) and (Th−Tg) are all equal and have the value td 531 which is the propagation time for the ranging packet and response packet to travel between the two STAs.

At STA A 400, the time of a packet at the point when the frame check has completed, may be recorded. Hence, if STA A 400 is the measuring station, the time for the transmission of ranging packet 412 that is recorded is Tc 512, and the time that is recorded for the reception of the response packet 424 is Th 514. In order to calculate the value of td, the duration tr 534 of the response packet 424 is calculated. Calculating the duration tr 534 is straightforward as the measuring station STA A 400 can monitor the details of the response packet such as data rate and length. In practice therefore, STA A 400 can calculate the value of td from expression (5):

$$td=(Th-Td-tr-t_{SIFS})/2 \quad (5)$$

and hence the corresponding distance, $D=td*c$ \quad (6)

Stated another way, STA A 400 begins transmission of ranging packet 412 at a beginning transmission time Ta 511 and ends transmission of the ranging packet 412 at an ending transmission time Tc 512. STA A 400 begins receiving of the response packet 424 at a beginning reception time Tf 413 and receives the complete response packet 424 at an ending reception time Th 514, wherein RTT is measured as the time between the ending reception time Th 514 and the ending transmission time Tc 512, minus the duration of the response packet tr 534, minus $t_{SIFS}$ 532.

Figure 1:
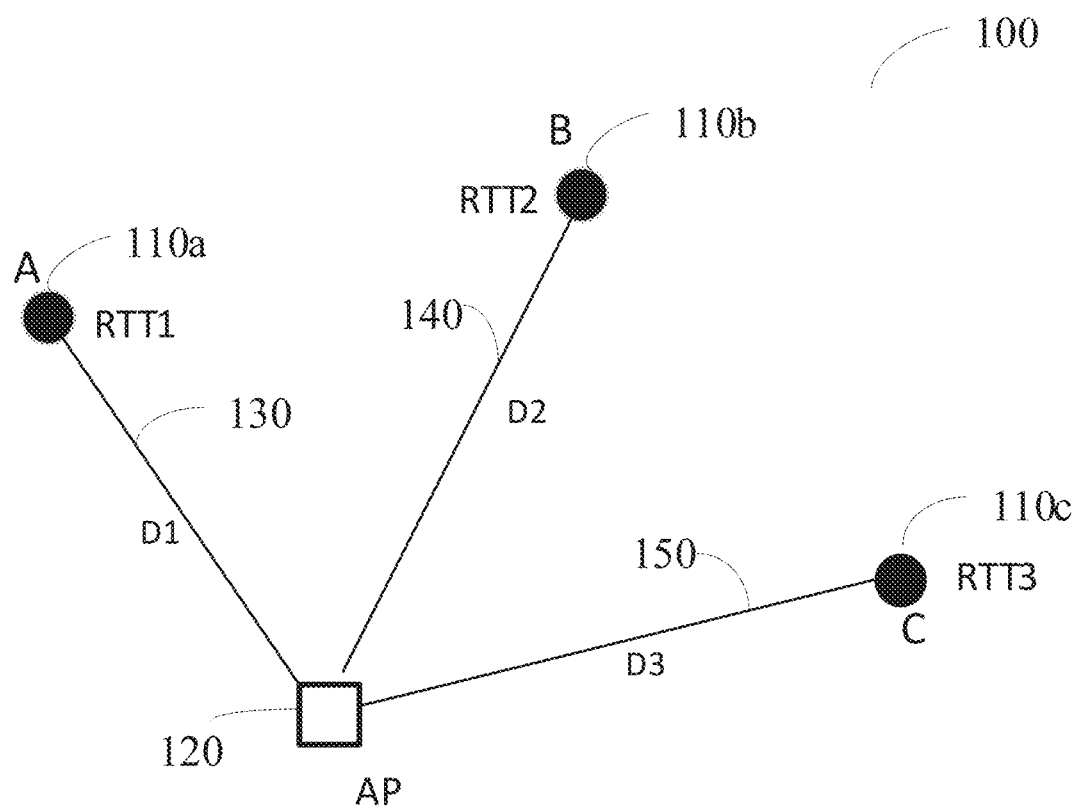
FIG. 1 is a diagram of a location system which includes three measuring stations.
Figure 2:
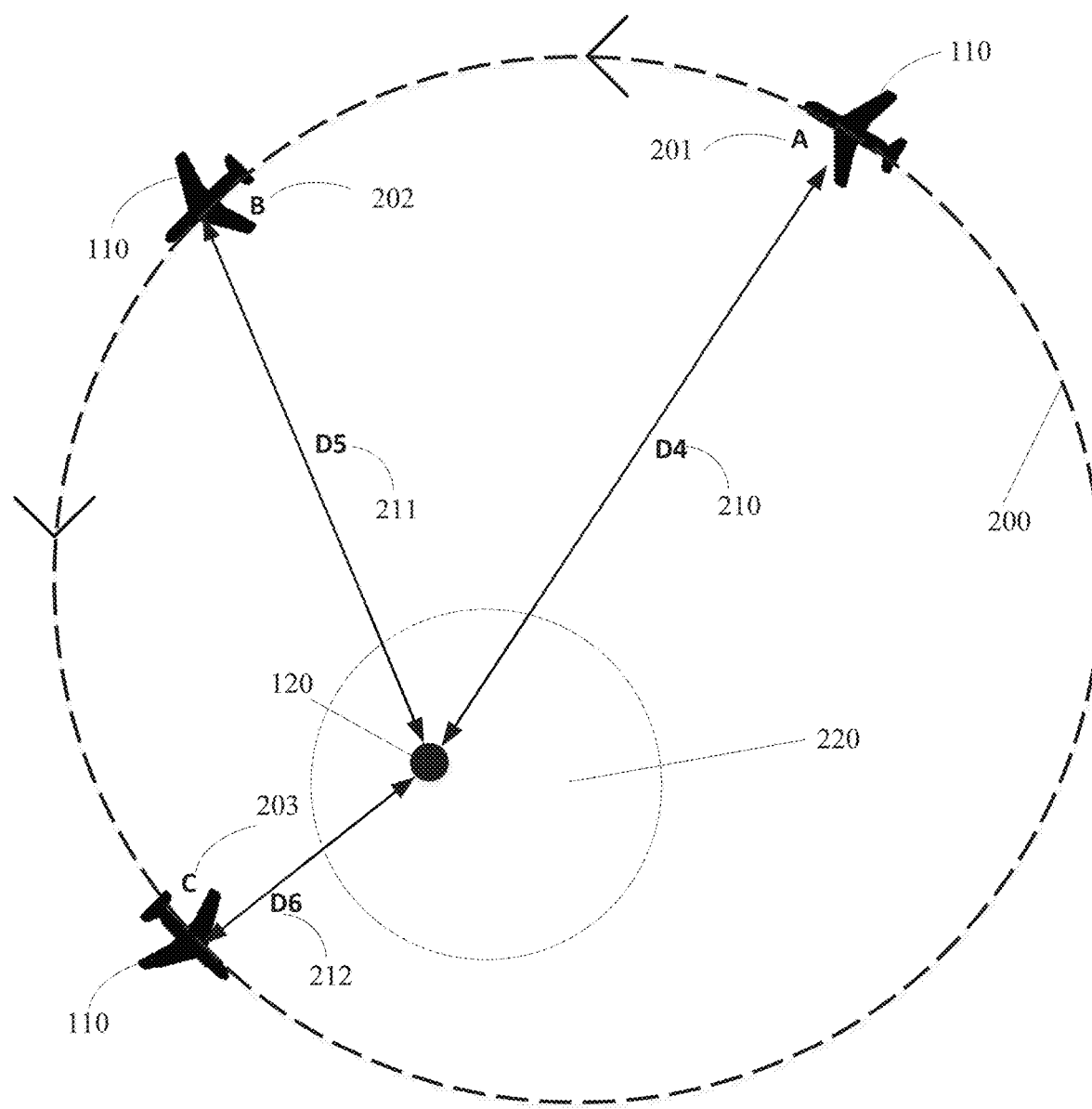
FIG. 2 is a diagram of an airborne measuring station actively geo-locating target stations.
Figure 3:
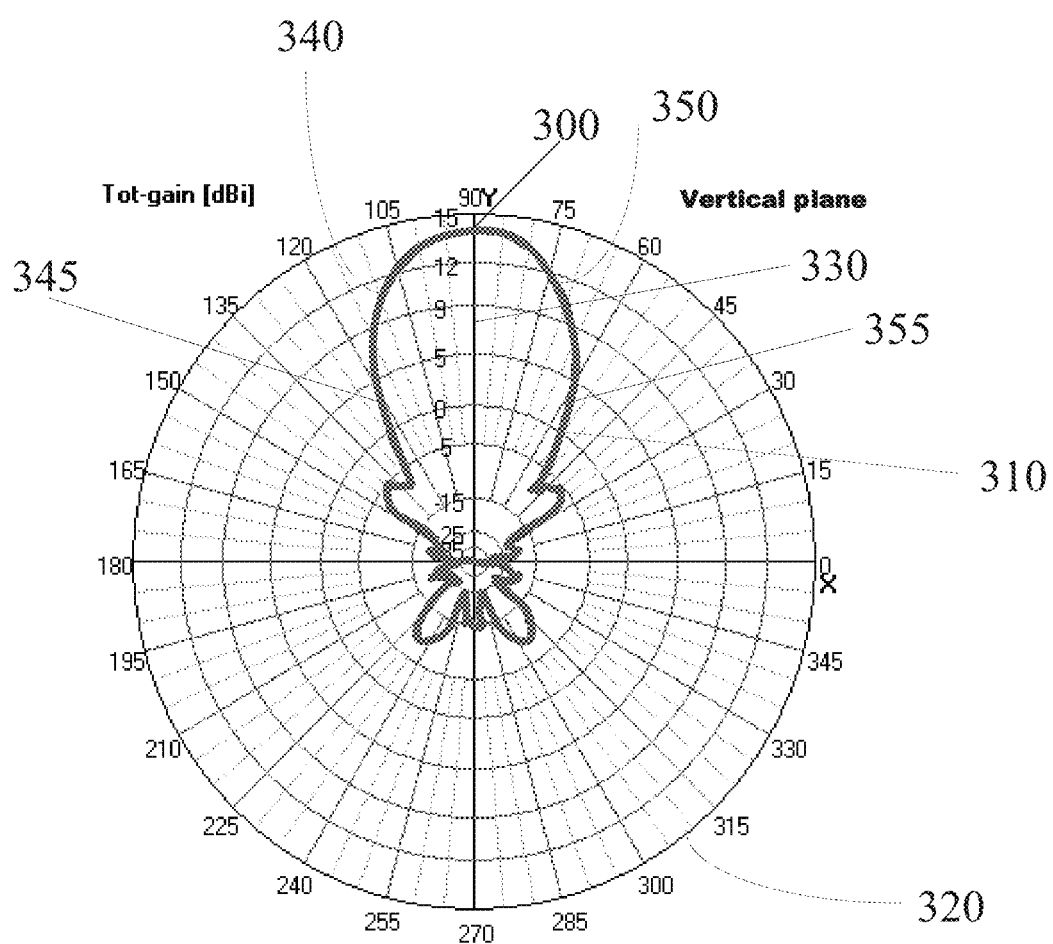
FIG. 3 is an exemplary plot of the gain of a directional antenna.

A reception window Trw 500 may be defined, which may be related to the range of the target STA B 405 as discussed above with reference to FIG. 2. The reception window starts at time Ts 501 after the end of the transmission Tc 512 of packet 412 and ends at time Tt 502 after the end of the transmission Tc 512 of packet 412.

As an example, consider the case where the target STA B 405 is known to be at a range between 2 and 5 miles from STA A 400. Note that this range is the distance from the airborne measuring station and hence takes into account the altitude A of the measuring station 110 above the ground. From equation (6), at a range of D, the propagation time, td=D/c. Hence, for a range of 2 miles, the propagation time, td=10.5 μs, and the RTT=2×10.5+$t_{SIFS}$. Similarly, for a range of 5 miles, the propagation time, td=26.4 μs, and the RTT=2×26.4+$t_{SIFS}$ In this example, assuming a value of $t_{SIFS}$=10 μs, the reception window Trw 500 may be set to start at time Ts 501, 31 μs after time Tc 512, and end at time Tt 502, 63 μs after time Tc 512. In this example the duration of the reception window Trw 500 is 32 μs.

Figure 6:
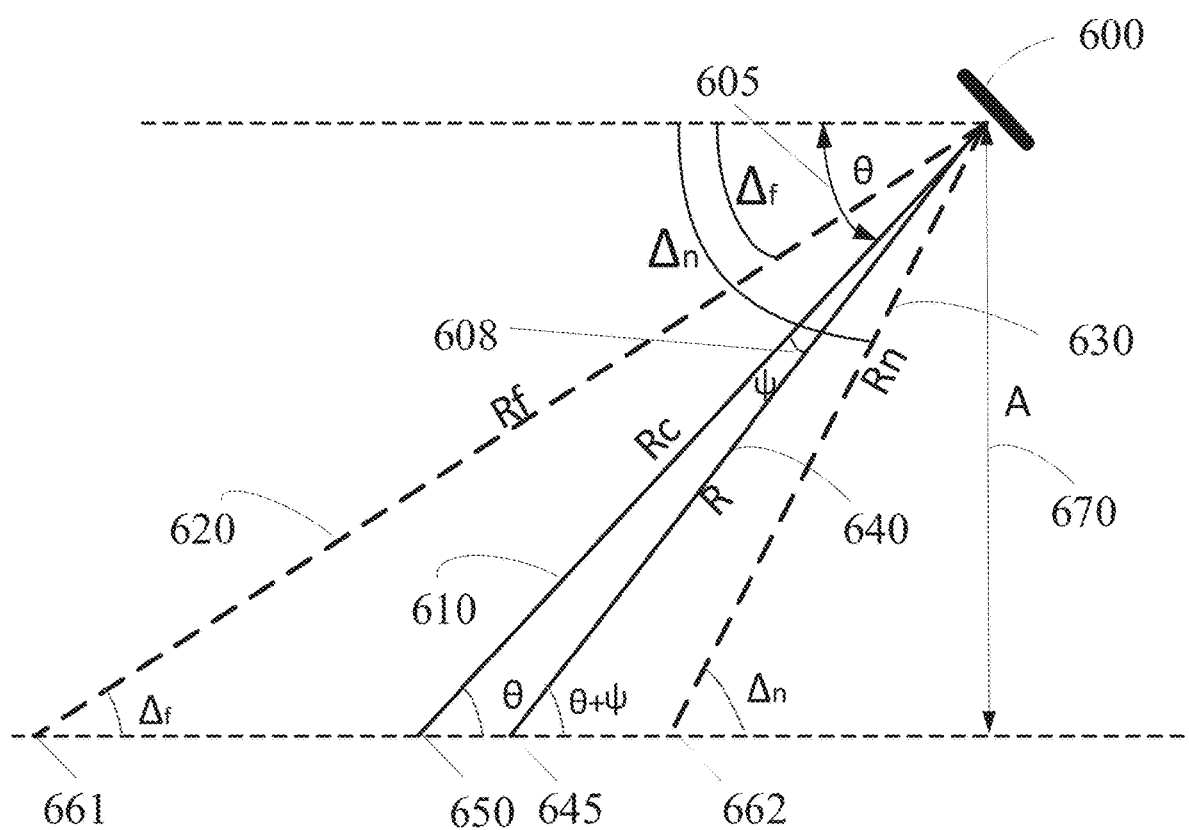
FIG. 6 is a diagrammatical representation of a directional antenna positioned at an altitude A above the earth's surface at a tilt angle θ.

FIG. 6 is a diagram showing a directional antenna 600 positioned at an altitude A 670 above the earth's surface at a tilt angle $\theta$ 605. Directional antenna 600 has a 3 dB beam width of 2Φ. Rc 610 is the distance from the directional antenna 600 to the ground of the maximum antenna gain position 650. Rn 630 is the distance from the directional antenna 600 to the ground of the −12 dB antenna gain near position 662, R 640 is the distance from the directional antenna 600 to the ground of the maximum antenna gain projection position 645, and Rf 620 is the distance from the directional antenna 600 to the ground of the −12 dB antenna gain far position 661. R 640 is the distance from the directional antenna 600 to the ground of an antenna projection distance R 640 that is at an angle of IP 608, such that the pitch angle of the projection range 640 is (θ+ψ). Antenna projection range R 640 is directed at position 645 on the ground. At position 645 the effective signal gain will be dependent upon:

a) The propagation loss due to distance R, and
b) The antenna relative loss due to the angle ψ.

Referring again to FIG. 6, using trigonometry, the value of the projection range R 640 is $$R = A/\sin(\theta+\psi) \quad (7)$$

Assuming free space propagation, the distance loss is proportional to the distance squared: hence, the relative distance loss, Ld, due to the range R 640 can be related to the altitude A 670.

$$Ld = (A\sin(\theta+\psi)/A)^2$$

Hence, $Ld = \sin^2(\theta+\psi)$ (8)

The relative loss due to the antenna beam width is given by equation (2). Hence, as the angle ψ is varied, the relative total gain, Gt, is the product of equations (2) and (8)

$$Gt = \sin^2(\theta+\psi)\cos^N(\psi) \quad (9)$$

The maximum value for the maximum total gain, Gt, can be derived by taking the first derivative of equation (9):

$$\frac{dGt}{d\psi} = \sin^2(\theta+\psi)\frac{d}{d\psi}(\cos^N\psi) + \cos^N\psi\frac{d}{d\psi}(\sin^2(\theta+\psi)) \quad (10)$$

$$\frac{d}{d\psi}(\cos^N\psi) = -N\cos^{N-1}\psi\sin\psi$$

$$\frac{d}{d\psi}(\sin^2(\theta+\psi)) = 2\sin(\theta+\psi)\cos(\theta+\psi)$$

Hence, $$\frac{dGt}{d\psi} = \sin^2(\theta+\psi)N\cos^{N-1}\psi\sin\psi + 2\cos^N\psi\sin(\theta+\psi)\cos(\theta+\psi)$$

For maximum Gt, $$\frac{dGt}{d\psi} = 0$$

i.e. $\sin(\theta+\psi)\cos^{N-1}\psi[-N\sin(\theta+\psi)\sin\psi + 2\cos\psi\cos(\theta+\psi)] = 0$ (11)

(11) reduces to $-N\tan(\theta+\psi)\tan\psi + 2 = 0$

Expanding tan(θ+ψ) and rearranging results in the following quadratic equation:

$$-N\tan^2\psi - (2+N)\tan\theta\tan\psi + 2 = 0 \quad (12)$$

Hence for maximum Gt $$\tan\psi\max = \frac{(N+2)\tan\theta - \sqrt{(2+N)^2\tan^2\theta + 8N}}{-2N} \quad (13)$$

And $\psi\max = ATAN\dfrac{(N+2)\tan\theta - \sqrt{(2+N)^2\tan^2\theta + 8N}}{-2N}$ Table 2 provides examples of the calculated values for the angle ψ max, for various tilt angles θ and antenna half beam widths Φ, for the projection that corresponds to the total maximum ground gain, using equation (14).

TABLE 2

| Tilt angle, θ BW/2, Φ | Angle ψmax, | | | | | | | | |
|---|---|---|---|---|---|---|---|---|---|
| | 10 | 20 | 30 | 40 | 50 | 60 | 70 | 80 | 90 |
| 10 | 7.8 | 5.3 | 3.8 | 2.7 | 2.0 | 1.4 | 0.9 | 0.4 | 0.0 |
| 15 | 13.2 | 9.9 | 7.4 | 5.6 | 4.1 | 2.9 | 1.9 | 0.9 | 0.0 |
| 20 | 18.4 | 14.6 | 11.5 | 8.9 | 6.7 | 4.8 | 3.1 | 1.5 | 0.0 |
| 25 | 23.3 | 19.2 | 15.6 | 12.4 | 9.5 | 6.9 | 4.5 | 2.2 | 0.0 |
| 30 | 28.0 | 23.6 | 19.5 | 15.8 | 12.3 | 9.0 | 5.9 | 2.9 | 0.0 |
| 35 | 32.3 | 27.7 | 23.3 | 19.0 | 15.0 | 11.1 | 7.4 | 3.7 | 0.0 |
| 40 | 36.3 | 31.5 | 26.8 | 22.1 | 17.6 | 13.1 | 8.7 | 4.4 | 0.0 |
| 45 | 40.0 | 35.0 | 30.0 | 25.0 | 20.0 | 15.0 | 10.0 | 5.0 | 0.0 |

Referring again to FIG. 6, the maximum gain projection range 640, is at an angle of (θ+ψ) referenced to the horizontal. Table 3 shows examples of the calculated values for the actual pitch angle, (θ+ψ) of the projection of the maximum antenna gain on the ground.

TABLE 3

| Tilt angle, θ BW/2, Φ | Projection angle max gain (θ + ψmax) | | | | | | | | |
|---|---|---|---|---|---|---|---|---|---|
| | 10 | 20 | 30 | 40 | 50 | 60 | 70 | 80 | 90 |
| 10 | 17.8 | 25.3 | 33.8 | 42.7 | 52.0 | 61.4 | 70.9 | 80.4 | 90.0 |
| 15 | 23.2 | 29.9 | 37.4 | 45.6 | 54.1 | 62.9 | 71.9 | 80.9 | 90.0 |
| 20 | 28.4 | 34.6 | 41.5 | 48.9 | 56.7 | 64.8 | 73.1 | 81.5 | 90.0 |
| 25 | 33.3 | 39.2 | 45.6 | 52.4 | 59.5 | 66.9 | 74.5 | 82.2 | 90.0 |
| 30 | 38.0 | 43.6 | 49.5 | 55.8 | 62.3 | 69.0 | 75.9 | 82.9 | 90.0 |
| 35 | 42.3 | 47.7 | 53.3 | 59.0 | 65.0 | 71.1 | 77.4 | 83.7 | 90.0 |
| 40 | 46.3 | 51.5 | 56.8 | 62.1 | 67.6 | 73.1 | 78.7 | 84.4 | 90.0 |
| 45 | 50.0 | 55.0 | 60.0 | 65.0 | 70.0 | 75.0 | 80.0 | 85.0 | 90.0 |

Referring again to FIG. 6, the maximum gain on the ground is at the distance R 640 at an antenna pitch angle of (θ+ψ). The projection Rn 630 is at an angle of (Δn−θ) relative to the boresight of the antenna and the projection Rf 620 is at an angle of (Δf+θ) relative to the boresight of the antenna. At position 662, the point on the ground where the distance to the antenna 600 is Rn 630 the effective signal gain will be dependent upon the propagation loss due to distance Rn, and the antenna relative loss due to the angle (Δn−θ). Similarly position 661, the point on the ground where the distance to the antenna 600 is Rf 620, the effective signal gain will be dependent upon the propagation loss due to distance Rf, and the antenna relative loss due to the angle (Δf+θ). A relative loss may be chosen for the near and far projections Rn 630 and Rf 640 respectively, compared to the maximum gain on the ground. A relative loss of 12 dB may be chosen as representing the near and far projections but other values might be used, such as 6 dB for example.

Having determined the antenna pitch angle for the maximum signal strength projection angle, the −12 dB gain projections can now be determined. Equation (9) is the relative value of the total gain, Gt.

$$Gt = \sin^2(\theta+\psi)\cos^N(\psi) \qquad (9)$$

The maximum value of Gt is given by, $$Gt\,max = \sin^2(\theta+\psi max)\cos^N(\psi max)$$

Hence, the −12 dB gain projections will be for two angles $\Delta f$ and $\Delta n$, where $$Gt = Gt\,max/15.8$$

Hence, $Gt_{-12} = \sin^2(\theta+\psi max)\cos^N(\psi max)/15.8$ $$\frac{Gt_{-12}}{Gt} = (\sin^2(\Delta f)\cos^N(\psi))/(\sin^2(\theta+\psi max)\cos^N(\psi max)) = 0.063 \qquad (14)$$

$$\frac{Gt_{-12}}{Gt} = (\sin^2(\Delta n)\cos^N(\psi))/(\sin^2(\theta+\psi max)\cos^N(\psi max)) = 0.063 \qquad (15)$$

Equations (14) and (15) cannot easily be solved for the projection angles $\Delta f$ and $\Delta n$ for the −12 dB far projection and the −12 dB near projection, but the values can be determined by an iterative process. Tables 4 and 5 show the results of calculating the −12 dB near and far projection angles respectively.

TABLE 4

| Tilt Angle, θ BW/ | −12 dB Near Projection Angle Δn | | | | | | | | |
|---|---|---|---|---|---|---|---|---|---|
| 2, Φ | 10 | 20 | 30 | 40 | 50 | 60 | 70 | 80 | 90 |
| 10 | 35 | 44 | 53 | 62 | 71 | 81 | 90 | 100 | 109 |
| 15 | 47 | 55 | 64 | 73 | 82 | 91 | 100 | 109 | 118 |
| 20 | 58 | 66 | 74 | 83 | 91 | 100 | 109 | 117 | 126 |
| 25 | 68 | 76 | 84 | 92 | 100 | 108 | 117 | 125 | 133 |
| 30 | 76 | 84 | 92 | 100 | 108 | 116 | 123 | 131 | 138 |
| 35 | 82 | 90 | 99 | 106 | 114 | 122 | 129 | 136 | 143 |
| 40 | 88 | 96 | 104 | 112 | 120 | 127 | 134 | 141 | 147 |
| 45 | 92 | 100 | 109 | 117 | 124 | 132 | 139 | 145 | 150 |

TABLE 5

| Tilt Angle, θ BW/ | −12 dB Far Projection Angle Δf | | | | | | | | |
|---|---|---|---|---|---|---|---|---|---|
| 2, Φ | 10 | 20 | 30 | 40 | 50 | 60 | 70 | 80 | 90 |
| 10 | 4 | 9 | 16 | 24 | 33 | 42 | 52 | 61 | 71 |
| 15 | 5 | 8 | 13 | 19 | 27 | 35 | 44 | 53 | 62 |
| 20 | 5 | 8 | 12 | 17 | 23 | 30 | 38 | 46 | 54 |
| 25 | 6 | 8 | 11 | 15 | 20 | 26 | 33 | 40 | 47 |
| 30 | 7 | 8 | 11 | 14 | 18 | 23 | 29 | 35 | 42 |
| 35 | 7 | 9 | 11 | 14 | 17 | 21 | 26 | 31 | 37 |
| 40 | 8 | 9 | 11 | 13 | 16 | 19 | 23 | 28 | 33 |
| 45 | 8 | 10 | 11 | 13 | 16 | 18 | 22 | 25 | 30 |

The following equations have been derived by second order approximations of the results given in Tables 4 and 5.

−12 dB Far Projection Angle $$\Delta f = (-14.83+1.08\Phi-0.013\Phi^2)+(1.11-0.061\Phi+0.00085\Phi^2)\theta+(0.00069+0.00028\Phi-0.0000057\Phi^2)\theta^2 \qquad (16)$$

−12 dB Near Projection Angle $$\Delta n = (-6.35+3.48\Phi-0.034\Phi^2)+(1.04-0.019\Phi+0.0004\Phi^2)\theta+(0.000156+0.000062\Phi-0.0000027\Phi^2)\theta^2 \qquad (17)$$

The errors that result in using the equations (16) and (17), compared to the results in Tables 4 and 5, are shown in Tables 6 and 7 respectively.

TABLE 6

| Tilt Angle, θ BW/ | −3 dB Far Projection Angle error using (16) | | | | | | | | |
|---|---|---|---|---|---|---|---|---|---|
| 2, Φ | 10 | 20 | 30 | 40 | 50 | 60 | 70 | 80 | 90 |
| 10 | −3 | −1 | −1 | −1 | −1 | −2 | −1 | −1 | 1 |
| 15 | −2 | 0 | 1 | 1 | 0 | 0 | 0 | 0 | 1 |
| 20 | −1 | 0 | 1 | 1 | 1 | 0 | 0 | 0 | 1 |
| 25 | 0 | 0 | 0 | 0 | 0 | 0 | 0 | 0 | 1 |
| 30 | 0 | 0 | 0 | 0 | 0 | 0 | 0 | 0 | 1 |
| 35 | 0 | 0 | 0 | 0 | 0 | 0 | 0 | 0 | 0 |
| 40 | 0 | 0 | 0 | 0 | 0 | 0 | 0 | 0 | 0 |
| 45 | 0 | 0 | 0 | 1 | 1 | 1 | 1 | 0 | 0 |

TABLE 7

| Tilt Angle, θ BW/ | −12 dB Near Projection error using (17) | | | | | | | | |
|---|---|---|---|---|---|---|---|---|---|
| 2, Φ | 10 | 20 | 30 | 40 | 50 | 60 | 70 | 80 | 90 |
| 10 | −1 | 0 | 0 | 0 | 0 | 0 | 0 | 0 | 0 |
| 15 | −1 | 0 | 0 | 0 | 0 | 0 | 0 | 0 | 0 |
| 20 | 0 | 0 | 0 | 0 | 0 | 0 | 0 | 0 | 0 |
| 25 | 0 | 0 | 0 | 0 | 0 | 0 | 0 | 0 | 0 |
| 30 | 0 | 0 | 0 | 0 | 0 | 0 | 0 | 0 | 1 |
| 35 | 0 | 0 | 0 | 0 | 0 | 0 | 0 | 0 | 1 |
| 40 | 0 | 0 | 0 | 0 | 0 | 0 | 0 | 0 | 1 |
| 45 | −1 | 0 | 0 | 0 | 0 | 0 | 0 | 0 | 1 |

The errors indicated in Tables 6 and 7 represent acceptable values. Hence, equations (16) and (17) may be used to estimate the −12 dB far and near projection angles respectively.

An antenna, with 3 dB beam width 2Φ, mounted in the airborne measuring station 110 may be pointed such that the maximum gain on the ground is at the center of the area of interest 220 using equation (14) or by reference to Tables 2 and/or 3. The effective antenna angles for the near and far −12 dB relative gains, on the ground, may then be calculated using equations (16) and (17) respectively or by reference to Tables 4 and 5 respectively.

Referring again to FIG. 6, the distance ranges Rn 630 and Rf 620 are:

$$Rn = A/\sin(\Delta n)$$

$$Rf = A/\sin(\Delta f)$$

where A is the altitude above ground of the airborne measuring station 110, θ is the tilt angle of the antenna 600 and $\Delta f$ and $\Delta n$ may be calculated using equations (16) and (17) for an antenna 110 of beamwidth 2Φ.

The corresponding reception window times are:

Reception window start time, $$Ts=2\times td+t_{SIFS}=2\times Rn/c+t_{SIFS}=2A/\sin(\Delta)/c+t_{SIFS} \quad (18)$$

Reception window end time, $$Tt=2\times td+t_{SIFS}=2\times Rf/c+t_{SIFS}=2A/\sin(0.6f))/c+t_{SIFS} \quad (19)$$

Table 6 shows that angles for the −12 dB near projection can be greater than 90 degrees.

Figure 7:
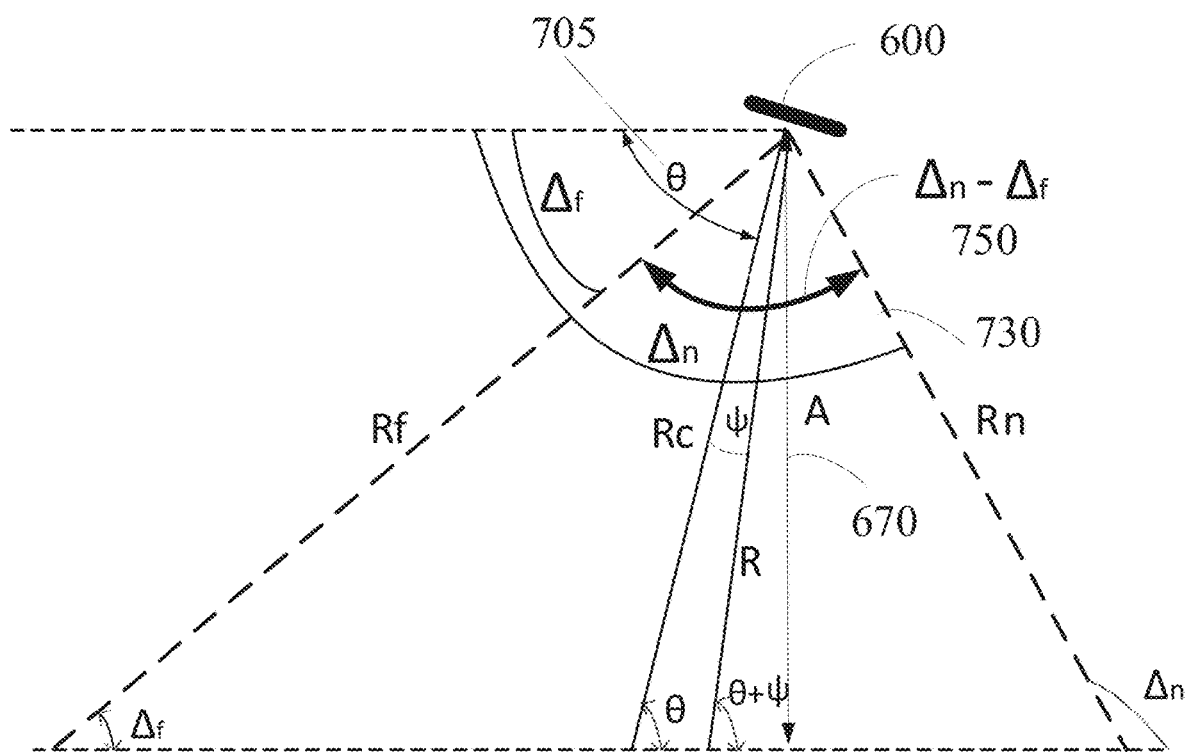
FIG. 7 is a diagrammatical representation of a directional antenna of beam width 2Φ, positioned at an altitude A above the earth's surface at a tilt angle θ, where θ=80° and Φ=30°.

FIG. 7 is a diagram showing a directional antenna 600 positioned at an altitude A 670 above the earth's surface at a tilt angle θ705 where θ=80° and Φ=30°. From Table 3 (θ+ψ)=82.9°, from Table 4, Δn=131° and from Table 5, Δf=35°. As the angle Δn is greater than 90° the distance Rn 730 is greater than the altitude A 670. The range of distances covered by the angle (Δn−Δf) 750 has a minimum at A 670. Hence, if Δn is greater than 90° the minimum distance is A. Hence, the minimum distance for Rn, is A. The value of Rn may then be calculated as shown in equation (20):

$$R_n = \begin{cases} \Delta_n > 90°, A \\ \dfrac{A}{\sin(\Delta_n)} \end{cases} \quad (20)$$

and equation (18) is modified to account for when Δn is greater than 90°:

$$T_s = \begin{cases} \Delta_n > 90°, \dfrac{2A}{c} + t_{SIFS} \\ \dfrac{2R_n}{c} + t_{SIFS} \end{cases} \text{ where } Rn = A/\sin(\Delta n) \quad (21)$$

Table 8 provides the calculated values for the −12 dB near range, Rn, 630, for an altitude A 670 of 10,000 feet above the ground using (20) and Table 9 provides the calculated values for the reception window start time, Ts 501, for an altitude A 670 of 10,000 feet above the ground using (21).

TABLE 8

| Tilt Angle, θ BW/2, Φ | −12 dB near range, Rn miles, for altitude 10,000 ft | | | | | | | | |
|---|---|---|---|---|---|---|---|---|---|
| | 10 | 20 | 30 | 40 | 50 | 60 | 70 | 80 | 90 |
| 10 | 3.4 | 2.8 | 2.4 | 2.2 | 2.0 | 1.9 | 1.9 | 1.9 | 1.9 |
| 15 | 2.6 | 2.3 | 2.1 | 2.0 | 1.9 | 1.9 | 1.9 | 1.9 | 1.9 |
| 20 | 2.2 | 2.1 | 2.0 | 1.9 | 1.9 | 1.9 | 1.9 | 1.9 | 1.9 |
| 25 | 2.0 | 2.0 | 1.9 | 1.9 | 1.9 | 1.9 | 1.9 | 1.9 | 1.9 |
| 30 | 2.0 | 1.9 | 1.9 | 1.9 | 1.9 | 1.9 | 1.9 | 1.9 | 1.9 |
| 35 | 1.9 | 1.9 | 1.9 | 1.9 | 1.9 | 1.9 | 1.9 | 1.9 | 1.9 |
| 40 | 1.9 | 1.9 | 1.9 | 1.9 | 1.9 | 1.9 | 1.9 | 1.9 | 1.9 |
| 45 | 1.9 | 1.9 | 1.9 | 1.9 | 1.9 | 1.9 | 1.9 | 1.9 | 1.9 |

TABLE 9

| Tilt Angle, θ BW/2, Φ | Reception window start time, Ts μs, for 10000 ft altitude | | | | | | | | |
|---|---|---|---|---|---|---|---|---|---|
| | 10 | 20 | 30 | 40 | 50 | 60 | 70 | 80 | 90 |
| 10 | 45.8 | 39.3 | 35.3 | 32.8 | 31.2 | 30.3 | 30.0 | 30.0 | 30.0 |
| 15 | 37.5 | 34.3 | 32.3 | 30.9 | 30.2 | 30.0 | 30.0 | 30.0 | 30.0 |
| 20 | 33.6 | 31.9 | 30.8 | 30.2 | 30.0 | 30.0 | 30.0 | 30.0 | 30.0 |
| 25 | 31.6 | 30.6 | 30.1 | 30.0 | 30.0 | 30.0 | 30.0 | 30.0 | 30.0 |
| 30 | 30.6 | 30.1 | 30.0 | 30.0 | 30.0 | 30.0 | 30.0 | 30.0 | 30.0 |
| 35 | 30.2 | 30.0 | 30.0 | 30.0 | 30.0 | 30.0 | 30.0 | 30.0 | 30.0 |
| 40 | 30.0 | 30.0 | 30.0 | 30.0 | 30.0 | 30.0 | 30.0 | 30.0 | 30.0 |
| 45 | 30.0 | 30.0 | 30.0 | 30.0 | 30.0 | 30.0 | 30.0 | 30.0 | 30.0 |

Table 10 provides the values for the −12 dB far projection angle for tilt angle θ values of 1 to 9 degrees. As the tilt angle θ 605 becomes smaller, for example when the target 120 is at a far distance, the calculated value for Δf may be zero or negative, as shown in Table 10. Hence, if the value for Δf is negative then the value for Δf is set to 0. Further examination of Table 10 shows that the value for Δf may be greater than the tilt angle. When the antenna is being pointed at a low tilt angle the target 120 is at a far distance hence if Δf is greater than the tilt angle θ then the value for Δf may be set equal to the tilt angle θ.

TABLE 10

| Tilt Angle, θ BW/2, Φ | −12 dB Far Projection Angle Δf | | | | | | | | |
|---|---|---|---|---|---|---|---|---|---|
| | 1 | 2 | 3 | 4 | 5 | 6 | 7 | 8 | 9 |
| 10 | −5 | −4 | −4 | −3 | −2 | −2 | −1 | 0 | 0 |
| 15 | −1 | −1 | 0 | 0 | 0 | 1 | 1 | 2 | 2 |
| 20 | 2 | 2 | 2 | 3 | 3 | 3 | 3 | 4 | 4 |
| 25 | 4 | 4 | 4 | 5 | 5 | 5 | 5 | 5 | 5 |
| 30 | 6 | 6 | 6 | 6 | 6 | 6 | 6 | 7 | 7 |
| 35 | 7 | 7 | 7 | 7 | 7 | 7 | 7 | 7 | 8 |
| 40 | 8 | 8 | 8 | 8 | 8 | 8 | 8 | 8 | 8 |
| 45 | 8 | 8 | 8 | 8 | 8 | 8 | 8 | 8 | 8 |

Table 11 provides the values for the −12 dB far projection angle Δf for tilt angle θ values of 1 to 9 degrees, where $$\Delta_f = \begin{cases} \Delta_f < 0°, 0 \\ \Delta_f < \theta, \theta \end{cases} \quad (22)$$

TABLE 11

| Tilt Angle, θ BW/2, Φ | Corrected −12 dB Far Projection Angle Δf | | | | | | | | |
|---|---|---|---|---|---|---|---|---|---|
| | 1 | 2 | 3 | 4 | 5 | 6 | 7 | 8 | 9 |
| 10 | 0 | 0 | 0 | 0 | 0 | 0 | 0 | 0 | 0 |
| 15 | 0 | 0 | 0 | 0 | 0 | 1 | 1 | 2 | 2 |
| 20 | 1 | 2 | 2 | 3 | 3 | 3 | 3 | 4 | 4 |
| 25 | 1 | 2 | 3 | 4 | 5 | 5 | 5 | 5 | 5 |
| 30 | 1 | 2 | 3 | 4 | 5 | 6 | 6 | 7 | 7 |
| 35 | 1 | 2 | 3 | 4 | 5 | 6 | 7 | 7 | 8 |
| 40 | 1 | 2 | 3 | 4 | 5 | 6 | 7 | 8 | 8 |
| 45 | 1 | 2 | 3 | 4 | 5 | 6 | 7 | 8 | 8 |

As the value of the far projection angle Δf approaches zero then the value of the far projection range, Rf, becomes large, Rfmax. Hence the value of Rf is calculated as shown in equation (23).

$$\text{For } \Delta_f = \begin{cases} \Delta_f < 0°, 0° \\ \Delta_f < \theta, \theta \end{cases} \quad (23)$$

$$R_f = \begin{cases} \Delta_f = 0°, R_{fmax} \\ \dfrac{A}{\sin(\Delta_f)} > R_{fmax}, R_{fmax} \\ \dfrac{A}{\sin(\Delta_f)} \end{cases}$$

Referring again to FIG. 5, the time between ranging packets 412 is Tp 550 and the end time of the reception window is Tt 502. The maximum time, $T_{tmax}$, of Tt 502 to allow the transmission of the ranging packet 412 and the reception of the response packet 424 is $$T_{tmax} = (Tp - tp - tr) \quad (24)$$

Hence, equation (19) is modified to account for the conditions as per equation (23).

$$T_t = \begin{cases} \Delta_f = 0°, T_{tmax} \\ \dfrac{2R_f}{c} + t_{SIFS} > T_{tmax}, T_{tmax} \text{ where } Rf = A/\sin(\Delta f) \\ \dfrac{2R_f}{c} + t_{SIFS} \end{cases} \quad (25)$$

$$\text{and } Rf\max = c(T t\max - t_{SIFS})/2 \quad (26)$$

For example, if the time between ranging packets, Tp 550, is 1 ms, and if the ranging packet is an RTS packet at 1 Mbps, and if the response packet is a CTS packet at 1 Mbps, then tp=352 µs and tr=304 µs and $T_{tmax}$=(1000−352−304) =344 µs. In this example Rfmax=c($T_{tmax}$−$t_{SIFS}$)/2=1000×(344−10)/ 2=167000 ft=31.6 miles.

Tables 12 and 13 provide the calculated values for the far range Rf 620 and the reception window end time Tt 502 respectively, for antenna tilt angles θ 605, of 1 to 9 degrees and for an altitude A 670 of 10,000 feet above the ground using equations (22), (23), (24), (25) and (26).

TABLE 12

| Tilt Angle, θ BW/2, Φ | Far range Rf miles, for 10000 ft altitude | | | | | | | | |
|---|---|---|---|---|---|---|---|---|---|
| | 1 | 2 | 3 | 4 | 5 | 6 | 7 | 8 | 9 |
| 10 | 31.6 | 31.6 | 31.6 | 31.6 | 31.6 | 31.6 | 31.6 | 31.6 | 31.6 |
| 15 | 31.6 | 31.6 | 31.6 | 31.6 | 31.6 | 31.6 | 31.6 | 31.6 | 31.6 |
| 20 | 31.6 | 31.6 | 31.6 | 31.6 | 31.6 | 31.6 | 31.6 | 29.3 | 27.1 |
| 25 | 31.6 | 31.6 | 31.6 | 31.6 | 27.2 | 22.9 | 22.1 | 21.3 | 20.6 | 19.9 |
| 30 | 31.6 | 31.6 | 31.6 | 27.2 | 21.7 | 18.1 | 17.0 | 16.7 | 16.4 |
| 35 | 31.6 | 31.6 | 31.6 | 27.2 | 21.7 | 18.1 | 15.5 | 14.6 | 14.5 |
| 40 | 31.6 | 31.6 | 31.6 | 27.2 | 21.7 | 18.1 | 15.5 | 13.6 | 13.4 |
| 45 | 31.6 | 31.6 | 31.6 | 27.2 | 21.7 | 18.1 | 15.5 | 13.6 | 13.0 |

TABLE 13

| Tilt Angle, θ BW/2, Φ | Reception window end time, Tt µs, for 10000 ft altitude | | | | | | | | |
|---|---|---|---|---|---|---|---|---|---|
| | 1 | 2 | 3 | 4 | 5 | 6 | 7 | 8 | 9 |
| 10 | 344.0 | 344.0 | 344.0 | 344.0 | 344.0 | 344.0 | 344.0 | 344.0 | 344.0 |
| 15 | 344.0 | 344.0 | 344.0 | 344.0 | 344.0 | 344.0 | 344.0 | 344.0 | 344.0 |
| 20 | 344.0 | 344.0 | 344.0 | 344.0 | 344.0 | 344.0 | 344.0 | 319.9 | 296.5 |
| 25 | 344.0 | 344.0 | 344.0 | 296.7 | 251.5 | 243.4 | 235.4 | 227.6 | 220.1 |
| 30 | 344.0 | 344.0 | 344.0 | 296.7 | 239.5 | 201.3 | 189.2 | 186.2 | 183.1 |
| 35 | 344.0 | 344.0 | 344.0 | 296.7 | 239.5 | 201.3 | 174.1 | 164.6 | 163.0 |
| 40 | 344.0 | 344.0 | 344.0 | 296.7 | 239.5 | 201.3 | 174.1 | 153.7 | 151.9 |
| 45 | 344.0 | 344.0 | 344.0 | 296.7 | 239.5 | 201.3 | 174.1 | 153.7 | 146.9 |

Tables 14 and 15 provide the calculated values for the far range Rf 620 and the reception window end time Tt 502 respectively, for antenna tilt angles θ 605, of 10 to 90 degrees and for an altitude A 670 of 10,000 feet above the ground using equations (22), (23), (24), (25) and (26).

TABLE 14

| Tilt Angle, θ BW/2, Φ | Far range, Rf miles for 10000 ft altitude | | | | | | | | |
|---|---|---|---|---|---|---|---|---|---|
| | 10 | 20 | 30 | 40 | 50 | 60 | 70 | 80 | 90 |
| 10 | 27.2 | 12.5 | 7.0 | 4.7 | 3.5 | 2.8 | 2.4 | 2.2 | 2.0 |
| 15 | 24.1 | 14.1 | 8.5 | 5.7 | 4.2 | 3.3 | 2.7 | 2.4 | 2.1 |
| 20 | 20.9 | 14.1 | 9.5 | 6.6 | 4.9 | 3.8 | 3.1 | 2.6 | 2.3 |
| 25 | 18.4 | 13.6 | 9.9 | 7.3 | 5.5 | 4.3 | 3.5 | 3.0 | 2.6 |
| 30 | 16.5 | 13.0 | 10.0 | 7.8 | 6.1 | 4.8 | 4.0 | 3.3 | 2.8 |
| 35 | 15.1 | 12.2 | 9.9 | 8.1 | 6.5 | 5.3 | 4.4 | 3.7 | 3.1 |
| 40 | 13.8 | 11.6 | 9.8 | 8.2 | 6.8 | 5.7 | 4.8 | 4.0 | 3.5 |
| 45 | 13.0 | 11.1 | 9.6 | 8.2 | 7.0 | 6.0 | 5.2 | 4.4 | 3.8 |

TABLE 15

| Tilt Angle, θ BW/2, Φ | Reception window end time, Tt µs, for 10000 ft altitude | | | | | | | | |
|---|---|---|---|---|---|---|---|---|---|
| | 10 | 20 | 30 | 40 | 50 | 60 | 70 | 80 | 90 |
| 10 | 296.7 | 142.2 | 83.9 | 59.2 | 46.8 | 39.8 | 35.6 | 32.9 | 31.2 |
| 15 | 264.9 | 159.3 | 100.3 | 70.5 | 54.1 | 44.7 | 38.8 | 35.1 | 32.7 |
| 20 | 230.7 | 159.3 | 110.3 | 80.0 | 61.6 | 50.1 | 42.8 | 37.9 | 34.7 |
| 25 | 204.6 | 153.7 | 114.8 | 87.3 | 68.5 | 55.8 | 47.1 | 41.2 | 37.2 |
| 30 | 184.0 | 146.9 | 115.8 | 92.1 | 74.4 | 61.2 | 51.8 | 44.9 | 40.0 |
| 35 | 169.6 | 139.3 | 114.8 | 95.1 | 78.8 | 66.1 | 56.3 | 48.8 | 43.2 |
| 40 | 155.5 | 132.5 | 113.0 | 96.3 | 82.1 | 70.2 | 60.6 | 52.7 | 46.5 |
| 45 | 146.9 | 127.5 | 111.2 | 96.9 | 84.4 | 73.7 | 64.6 | 56.6 | 49.9 |

Figure 8:
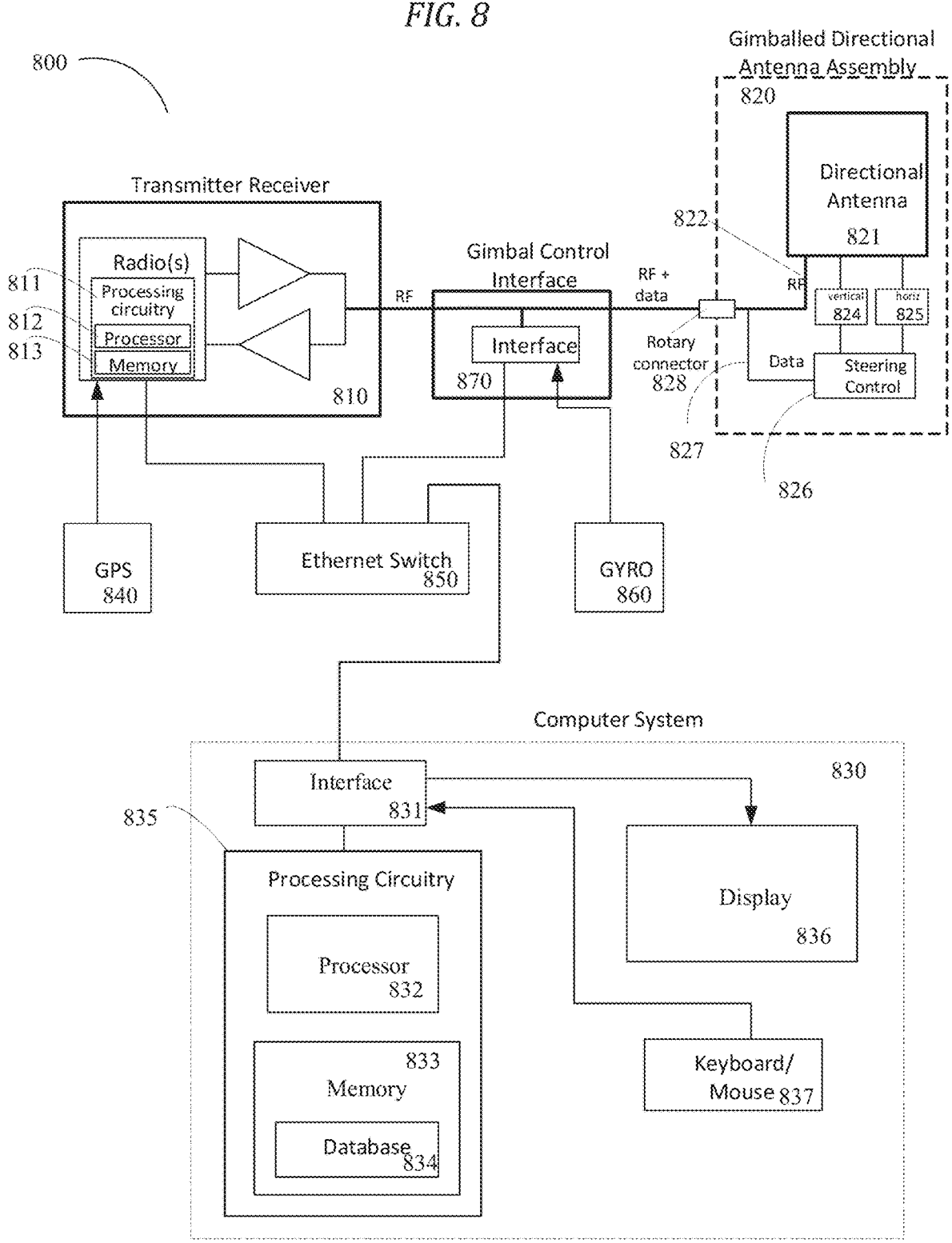
FIG. 8 is a block diagram of an example airborne system employing a gimballed directional antenna that is used in accordance with the principles described herein.

FIG. 8 is a block diagram of an example airborne system 800 employing a gimballed directional antenna 821 that is used in accordance with the principles described herein to perform the methods described herein. In one embodiment, the gimballed directional antenna 821 may be antenna 600. In one embodiment, airborne system 800 may include a gimballed directional antenna assembly 820, a transmitter receiver 810, a gimbal control interface module 870, a computer system 830, a global positioning system (GPS) module 840, a gyro module 860 and a network switch 850 such as, for example, an Ethernet switch.

A directional antenna 821 may be part of the gimballed antenna assembly 820 which may also include a steering control module 826 which may operate two motors 824 and 825 that control the vertical and horizontal orientations of the directional antenna 821, respectively. The transmitter receiver 810 may transmit or receive radio frequency (RF) signals to and from the directional antenna 821. The RF signal from the transmitter receiver 810 may be connected to the gimbal control interface module 870. The gyro module 860 may provide yaw, pitch and roll information of the airborne platform and the gyro module output may be inputted to the gimbal control interface module 870. The GPS module 840 output may be connected to the transmitter receiver 810. The GPS module 840 may provide the latitude, longitude and elevation of the airborne platform. The transmitter receiver 810 may append GPS information to any RF transmission. The network switch 850 may be connected to the Transmitter Receiver 810, the computer system 830 and the gimbal control interface module 870.

The gimbal control interface module may take data via the network switch 850 and data from the gyro module 860 and convert it to a data stream which is added to the RF signal to or from the transmitter receiver 810. The combined RF and data stream may then be connected to the gimballed directional antenna assembly 820 via a rotary connector 828. The data 827 may be filtered from the RF signal 822 and connected to the steering control module 826 and used to control the vertical and horizontal position of the directional antenna 821. Information on the tilt angle of the directional antenna 821 may be fed back to the gimbal control interface module 870 where it may be converted into data such as Ethernet and applied to the network switch 850.

The transmitter receiver 810 may include processing circuitry 811. The GPS information may be provided to the processing circuitry 811 by the GPS module 840. In some embodiments, processing circuitry 811 includes a processor 812 and a memory 813, the memory 813 containing instructions which, when executed by the processor 812, configure the processor 812 to perform the one or more functions described herein. In addition to a traditional processor and memory, the processing circuitry 811 may comprise integrated circuitry for processing and/or control, e.g., one or more processors and/or processor cores and/or FPGAs (Field Programmable Gate Array) and/or ASIC s (Application Specific Integrated Circuitry).

The processing circuitry 811 may include and/or be connected to and/or be configured for accessing (e.g., writing to and/or reading from) the memory 813, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 813 may be configured to store code executable by control circuitry and/or other data, e.g., data pertaining to communication, e.g., configuration and/or address data of nodes, etc. The processing circuitry 811 may be configured to control any of the methods described herein and/or to cause such methods to be performed, e.g., by the processor 812. Corresponding instructions may be stored in the memory 813, which may be readable and/or readably connected to the processing circuitry 811. In other words, the processing circuitry 811 may include a controller, which may comprise a microprocessor and/or microcontroller and/or FPGA device and/or ASIC device. It may be considered that the processing circuitry 811 includes or may be connected or connectable to memory, which may be configured to be accessible for reading and/or writing by the controller and/or processing circuitry 811.

RF receptions may have the GPS information added such that the position of the airborne platform is known for each received signal. The transmitter receiver 810 may include more than one radio and therefore any transmission may be automatically received by another radio within the transmitter receiver and by this means, the airborne platform position is also known for each transmission. The GPS information may be sent to the network switch 850 and therefore made available to the computer system 830.

The computer system 830 may include an interface 831. Interface 831 may contain an Ethernet connection to the network switch 850, the connection to a display 836, a connection to a keyboard and mouse 837 as well as interfacing to the processing circuitry 835. In some embodiments the processing circuitry 835 may include a processor 832, a memory 833 and a database 834. The database 834 may contain the ground mapping information of the area of interest and the processor 832 and memory 833 may be used to carry out the exemplary methods 900 and 1000, described below, using information on the position of the airborne platform derived from the GPS module 840, the gyro module 860, and beam width information on the directional antenna 821 which may be inputted using the keyboard/mouse 837. The tilt angle may be transferred from the network switch 850 to the interface 831. The display 836 may be used to show the ground map together with the directional antenna ground projection which may be derived using the exemplary methods 900 and 1000, described below. Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

Thus, in some embodiments, the processing circuitry 835 may include a memory 833 and a processor 832, the memory 833 containing instructions which, when executed by the processor 832, configure the processor 832 to perform the one or more functions described herein. In addition to a traditional processor and memory, the processing circuitry 835 may comprise integrated circuitry for processing and/or control, e.g., one or more processors and/or processor cores and/or FPGAs and/or ASICs.

The processing circuitry 835 may include and/or be connected to and/or be configured for accessing (e.g., writing to and/or reading from) the memory 833, which may include any kind of volatile and/or non-volatile memory, e.g., cache and/or buffer memory and/or RAM and/or ROM and/or optical memory and/or EPROM. Such memory 833 may be configured to store code executable by control circuitry and/or other data, e.g., data pertaining to communication, e.g., configuration and/or address data of nodes, etc. The processing circuitry 835 may be configured to control any of the methods described herein and/or to cause such methods to be performed, e.g., by the processor 832. Corresponding instructions may be stored in the memory 833, which may be readable and/or readably connected to the processing circuitry 835. In other words, the processing circuitry 835 may include a controller, which may comprise a microprocessor and/or microcontroller and/or FPGA device and/or ASIC device. It may be considered that the processing circuitry 835 includes or may be connected or connectable to memory, which may be configured to be accessible for reading and/or writing by the controller and/or processing circuitry 835.

Figure 9:
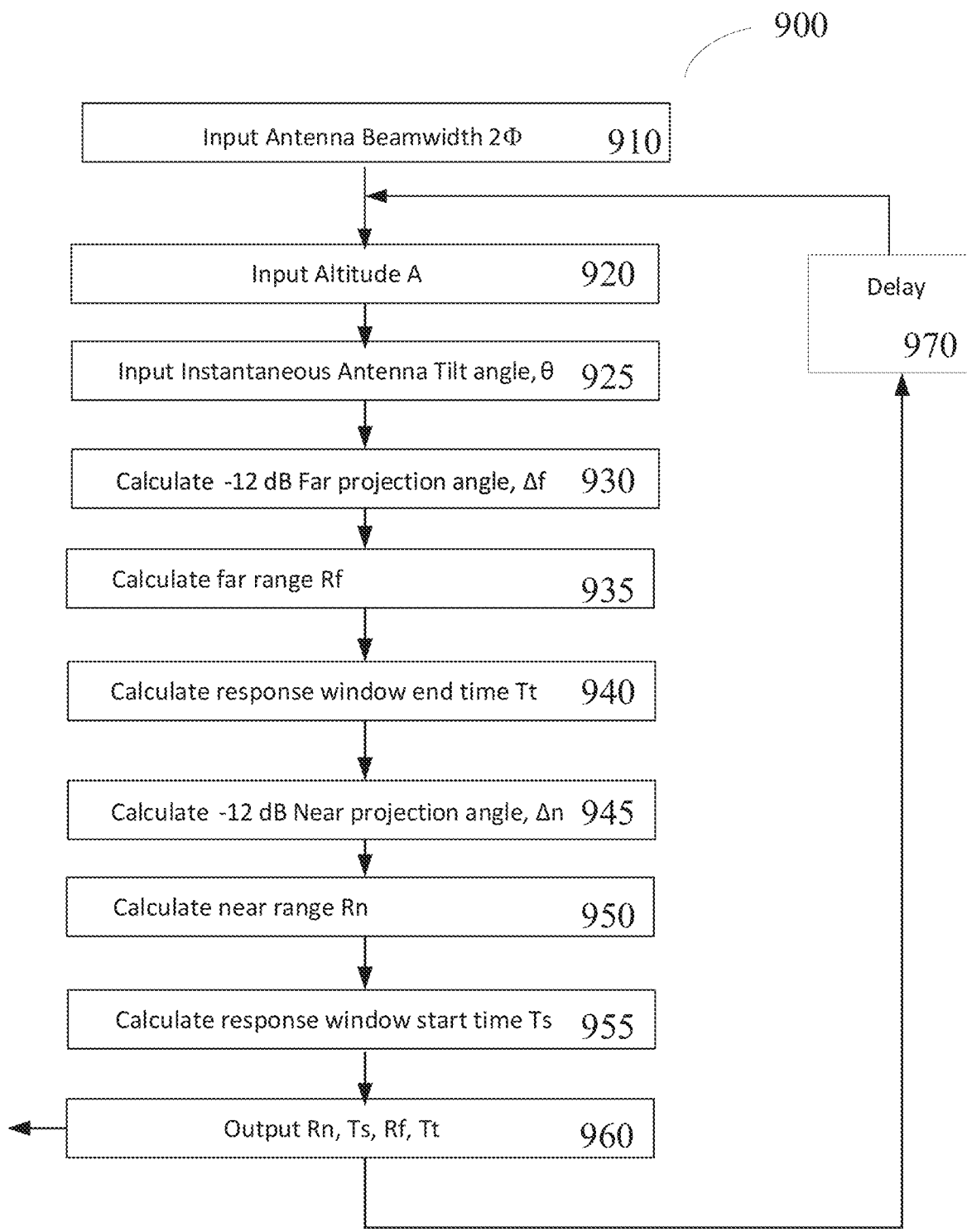
FIG. 9 is a flowchart of an exemplary method of determining the −12 dB far and near ranges and the start and end times of the reception window according to an embodiment of the disclosure.

FIG. 9 is a flowchart of an exemplary method 900 of determining the −12 dB far and near ranges, and the start and end times, of the reception window according to an embodiment of the disclosure. Method 900 takes the inputs, for example as received via keyboard/mouse 837, for the antenna beam width and tilt angle and determines, via the processor 832, the angles for the −12 dB far and near projections. The resultant values may then be used to determine the far and near ranges and the start and end times of the reception window. Method 900 may start at step 910 where the value, 2Φ, of the antenna beam width is inputted to the computer system 830, via the keyboard/mouse 837. The beam width of an antenna will be a fixed value. Step 910 may be followed by step 920 where the value for the altitude or elevation, A 670, of the airborne platform above the ground is inputted, via the interface 831 to the processing circuitry 835, or is calculated by the processor 832. The value for the altitude A may be derived by a combination of input from external devices, such as GPS (Global Positioning System) and the aircraft instrumentation or the gyro module 860. Methods of deriving the altitude above ground are well known and do not form part of this disclosure. Step 920 may be followed by step 925 where the value for the antenna tilt angle is inputted, via the interface 831 to the processing circuitry 835, or is calculated by the processor 832. The tilt angle may vary and therefore the pitch value entered may be the instantaneous value. The antenna 821 may be mounted in a gimballed system where the tilt angle may vary, or the antenna may be fixed such that the tilt angle is effectively steady. If mounted in an aircraft, subject to pitch and yaw, the movements of the aircraft may affect the tilt angle. If the antenna 821 is mounted in an aircraft the tilt angle may be derived by a combination of input from external devices, such as GPS (Global Positioning System) and the aircraft instrumentation or the gyro module 860. Methods of deriving the tilt angle of the antenna 821 are well known and do not form part of this disclosure.

Step 925 may be followed by step 930 where the −12 dB far projection angle, Δf, may be calculated, via the processor 832, either by the use of equation (14) using an iterative process, or by use of equation (16), or by use of a look up table, such as Table 5. Step 930 may be followed by step 935 where the range of the far projection, Rf 620 may be calculated, via the processor 832, either by the use of equations (22), (23), and (26), or by use of a look up table, such as Tables 10 and 12. Step 935 may be followed by step 940 where the window response end time, Tt 502, may be calculated, via the processor 832, either by the use of equations (24) and (25) or by use of a look up table, such as Tables 11 and 13.

Step 940 may be followed by step 945 where the −12 dB near projection angle, Δn, may be calculated, via the processor 832, either by the use of equation (15) using an iterative process, or by use of equation (17), or by use of a look up table, such as Table 4. Step 945 may be followed by step 950 where the range of the near projection, Rn 630, may be calculated, via the processor 832, either by the use of equation (20) or by use of a look up table, such as Table 8. Step 950 may be followed by step 955 where the window response start time, Ts 501, may be calculated, via the processor 832, either by the use of equation (21) or by use of a look up table, such as Table 9.

Step 955 may be followed by step 960 where the calculated values for the near and far −12 dB ranges, Rn 630 and Rf 620 respectively are outputted along with the calculated values for the start and end times of the reception window 500, Ts 501 and Tt 502 respectively. The Rn 630 and Rf 620 values may then be processed by the processing module 835 and outputted to the display 836 via the interface 831 so as to provide to the user a graphical display of the effective near and far range or window of the measurements as described above with reference to FIGS. 4 and 5. This display may be in various units such as kilometers, miles, nautical miles and is used solely to act as an aid to the user as a check on the area being covered by the geo location activity. The Ts 501 and Tt 502 values may be processed by the processing module 835 so as to set the reception window 500 as described above with reference to FIGS. 4 and 5. The reception window start and end times, Ts 501 and Tt 502 respectively, values outputted at step 960 may be determined by the processing module 835. After step 960 the method may return to step 920 via step 970 which may insert a delay before the method is repeated.

Figure 10:
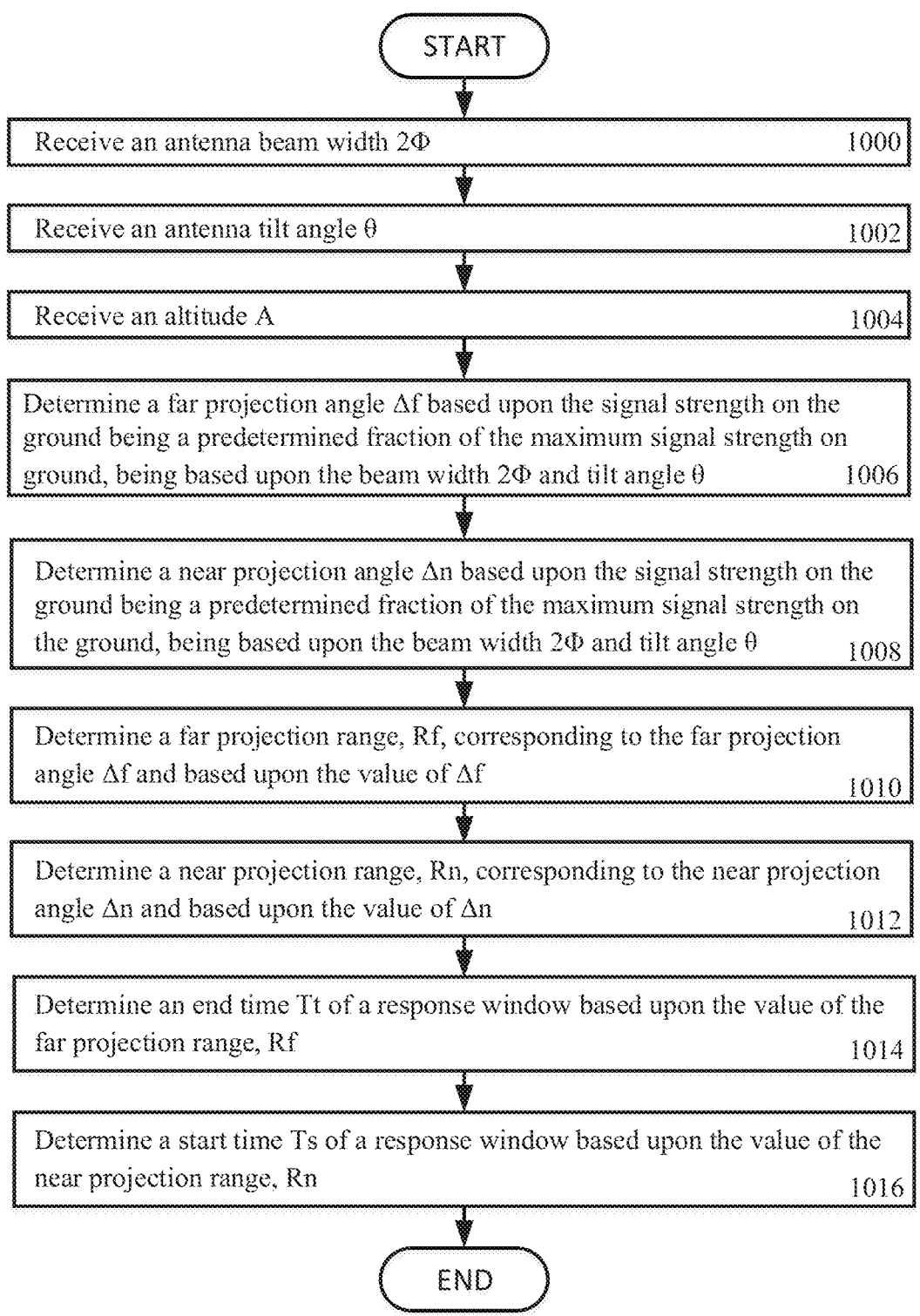
FIG. 10 is a flowchart of an exemplary process for determining at an airborne system employing a gimballed directional antenna that is used in accordance with the principles described herein.

FIG. 10 is a flowchart of an exemplary process for determining at an airborne system 800 employing a gimballed directional antenna 821 that is used in accordance with the principles described herein, the values for setting the timing parameters of a reception window and the corresponding near and far ranges, based upon the projection of the directional antenna 821 that is mounted in the airborne system 800. The process includes receiving an antenna beam width 2Φ as received via keyboard/mouse 837 (step 1000). The process further includes receiving an antenna tilt angle θ, via the interface 831 to the processing circuitry 835, or is calculated by the processor 832 (step 1002). The process further includes receiving an altitude A via the interface 831 to the processing circuitry 835 derived by a combination of input from external devices, such as GPS (Global Positioning System) and the aircraft instrumentation or the gyro module 860 (step 1004). The process further includes determining a far projection angle Δf, calculated, via the processor 832, by the use of equation (16), based upon the signal strength on the ground being a predetermined fraction of the maximum signal strength on the ground, being based upon the beam width 2Φ and tilt angle θ (step 1006). The process further includes determining a near projection angle Δn, calculated, via the processor 832, using equation (17), based upon the signal strength on the ground being a predetermined fraction of the maximum signal strength on the ground, being based upon the beam width 2Φ and tilt angle θ (step 1008). The process further includes determining a far projection range, Rf, calculated via the processor 832 using equations (22) and (23) corresponding to the far projection angle Δf and based upon the value of Δf (step 1010). The process further includes determining a near projection range, Rn, calculated via the processor 832 using equation (20) corresponding to the far projection angle Δn and based upon the value of Δn (step 1012). The process further includes determining reception window end time Tt, calculated via the processor 832 using equations (24) and (25), of a reception window based upon the value of the far projection range, Rf (step 1014). The process further includes determining a reception window start time Ts, calculated via the processor 832 using equation (21), of a reception window based upon the value of the near projection range, Rn (step 1016).

Figure 11:
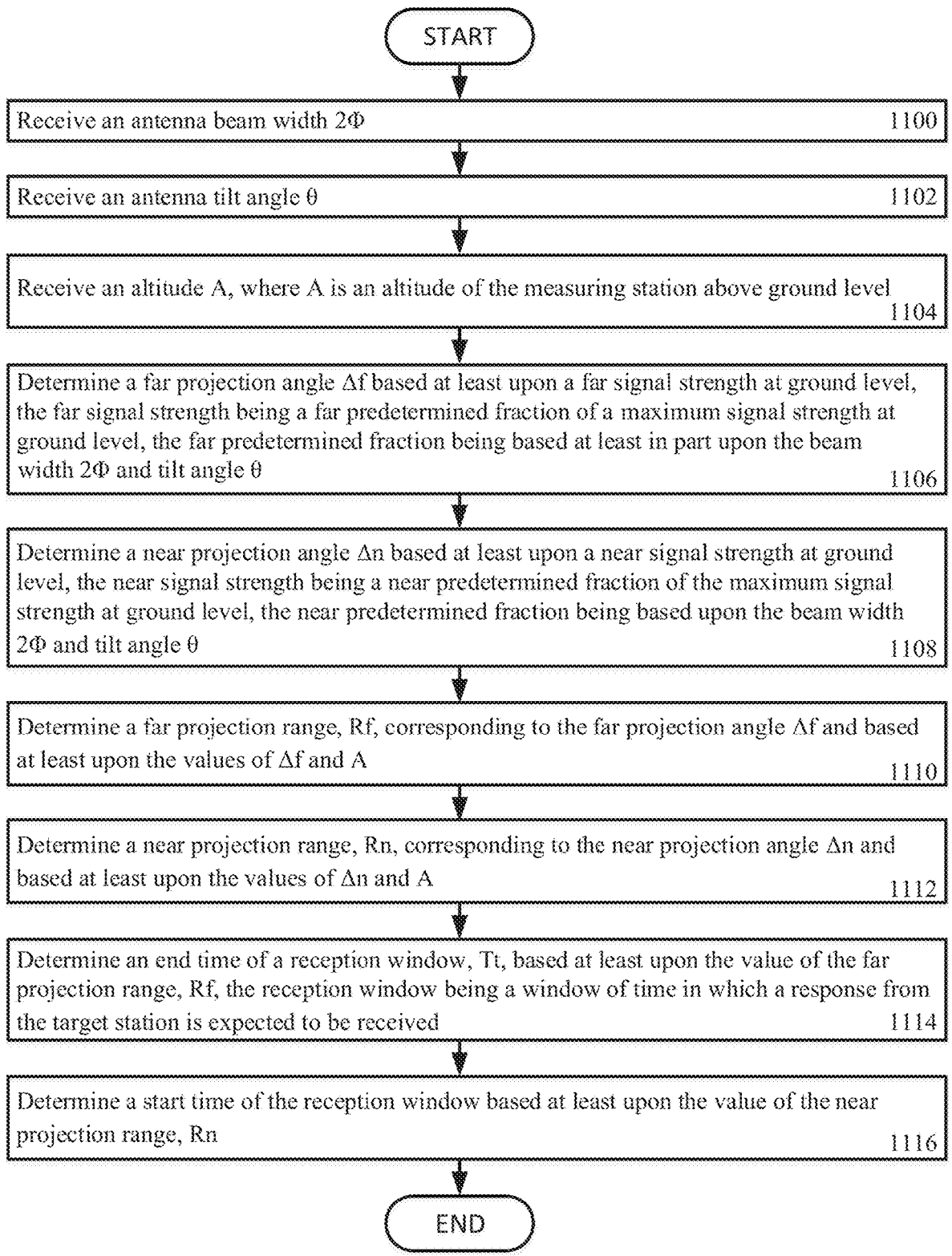
FIG. 11 is a flowchart of an exemplary process for determining reception window timing using a measuring station that is used in accordance with the principles described herein.

FIG. 11 is a flowchart of an exemplary process for determining reception window timing using a measuring station in accordance with the principles described herein. The measuring station includes a directional antenna having a boresight. The measuring station transmits signals to a target station and receives response signals from the target station corresponding to the transmitted signals. The process includes receiving an antenna beam width 2Φ(step 1100). The process further includes receiving an antenna tilt angle θ (step 1102). The process further includes receiving an altitude A, where A is an altitude of the measuring station above ground level (step 1104). The process further includes determining a far projection angle Δf based at least upon a far signal strength at ground level, the far signal strength being a far predetermined fraction of a maximum signal strength at ground level, the far predetermined fraction being based at least in part upon the beam width 2Φ and tilt angle θ (step 1106). The process further includes determining a near projection angle Δn based at least upon a near signal strength at ground level, the near signal strength being a near predetermined fraction of the maximum signal strength at ground level, the near predetermined fraction being based upon the beam width 2Φ and tilt angle θ (step 1108). The process further includes determining a far projection range, Rf, corresponding to the far projection angle Δf and based at least upon the values of Δf and A (step 1110). The process further includes determining a near projection range, Rn, corresponding to the near projection angle Δn and based at least upon the values of Δn and A (step 1112). The process further includes determining an end time of a reception window, Tt, based at least upon the value of the far projection range, Rf, the reception window being a window of time in which a response from the target station is expected to be received (step 1114). The process further includes determining a start time of the reception window based at least upon the value of the near projection range, Rn (step 1116).

Some examples include:

Example 1. A method for determining the timing parameters of a reception window and the corresponding near and far ranges, the setting being based at least upon the projection of a directional antenna that is mounted in the airborne measuring station, the method comprising:
  Receiving an antenna beam width 2ϕ;
  Receiving an antenna tilt angle θ;
  Receiving an altitude A, where A is the altitude of the airborne measuring station above ground level;
  Determining a far projection angle Δf being based at least upon the signal strength on the ground being a predetermined fraction of the maximum signal strength on the ground, being based upon the beam width 2ϕ and tilt angle θ;
  Determining a near projection angle Δn being based at least upon the signal strength on the ground being a predetermined fraction of the maximum signal strength on the ground, being based upon the beam width 2ϕ and tilt angle θ;
  Determining a far projection range, Rf, corresponding to the far projection angle Δf and based at least upon the values of Δf and A;
  Determining a near projection range, Rn, corresponding to the near projection angle Δn and based at least upon the values of Δn and A;
  Determining an end time of a reception window based at least upon the value of the far projection range, Rf;
  Determining a start time of a reception window based at least upon the value of the near projection range, Rn;

Example 2. The method of Example 1, wherein the far projection angle Δf is determined from the formula:

$$(\sin^2)\cos^N(\psi))/(\sin^2(\theta+\psi\max)\cos^N(\psi\max))=\text{Fraction}$$

Where (θ+ψ) is the pitch angle
(θ+ψmax) is the pitch angle of the maximum antenna gain on the ground
$\cos^N(x)$ is the antennal gain at angle x
Fraction is a predetermined fraction Example 3. The method of Example 1, wherein the near projection angle Δn is determined from the formula:

$$(\sin^2(\Delta n)\cos^N(\psi))/(\sin^2(\theta+\psi\max)\cos^N(\psi\max))=\text{Fraction}$$

Where (θ+ψ) is the pitch angle
(θ+ψmax) is the pitch angle of the maximum antenna gain on the ground
$\cos^N(x)$ is the antennal gain at angle x
Fraction is a predetermined fraction Example 4. The method of Example 1, wherein the predetermined fraction of the maximum signal strength on the ground, for the far and near projections, is 1/15.8.

Example 5. The method of Example 4, wherein the far projection angle Δf is determined as:

$$\Delta f = (-14.83+1.08\Phi-0.013\Phi^2)+(1.11-0.061\Phi+0.00085\Phi^2)\theta+(0.00069+0.00028\Phi-0.0000057\Phi^2)\theta^2$$

Example 6. The method of Example 4, wherein the near projection angle Δn is determined as:

$$\Delta n = (-6.35+3\Delta8\Phi-0.034\Phi^2)+(1.04-0.019\Phi+0.0004\Phi^2)\theta+(0.000156+0.000062\Phi-0.0000027\Phi^2)\theta^2$$

Example 7. The method of Example 1 where the far projection range Rf is determined as:

$$R_f = \begin{cases} \Delta_f = 0°, R_{f\max} \\ \dfrac{A}{\sin(\Delta_f)} > R_{f\max}, R_{f\max} \\ \dfrac{A}{\sin(\Delta_f)} \end{cases}$$

Where $\Delta_f = \begin{cases} \Delta_f < 0°, 0° \\ \Delta_f < \theta, \theta \end{cases}$ Where Rfmax is a maximum value for Rf derived from the time between successive transmitted ranging packets
A is altitude of airborne measuring station above ground Example 8. The method of Example 1 where the near projection range Rn is determined as:

$$R_n = \begin{cases} \Delta_n > 90°, A \\ \dfrac{A}{\sin(\Delta_n)} \end{cases}$$

Where A is altitude of airborne measuring station above ground

Example 9. The method of Example 1 where the reception window end time Tt, is determined as:

$$T_t = \begin{cases} \Delta_f = 0°, T_{t\max} \\ \dfrac{2R_f}{c} + t_{SIFS} > T_{t\max}, T_{t\max} \\ \dfrac{2R_f}{c} + t_{SIFS} \end{cases}$$

-continued $$\text{Where } \Delta_f = \begin{cases} \Delta_f < 0°, 0° \\ \Delta_f < \theta, \theta \end{cases}$$

Rf=A/sin ($\Delta$f)
c=speed of light
$T_{tmax}$ is a maximum value for Tt derived from the time between successive transmitted ranging packets
$t_{SIFS}$ is the short interframe spacing time Example 10. The method of Example 9 where the maximum value for the reception window end time, $T_{tmax}$ is determined as:

$$T_{tmax} = (Tp - tp - tr)$$

Where Tp is the time between transmitted request packets
tp is the duration of the request packet
tr is the duration of the response packet Example 11. The method of Example 7 where the maximum value of the far projection range Rfmax is determined as:

$$Rf \max = c(Tt \max - t_{SIFS})/2$$

Where c=speed of light
$T_{tmax}$ is a maximum value for Tt
$t_{SIFS}$ is the short interframe spacing time Example 12. The method of Example 1 where the reception window start time Ts, is determined as:

$$T_s = \begin{cases} \Delta_n > 90°, \dfrac{2A}{c} + t_{SIFS} \\ \dfrac{2R_n}{c} + t_{SIFS} \end{cases}$$

Where Rn=A/sin ($\Delta$n)
c=speed of light
$t_{SIFS}$ is the short interframe spacing time Example 13. A first wireless device (WD) comprising:
Processing circuitry in communication with the WD, the processing circuitry configured to:
Receive an antenna beam width $2\phi$;
Receive an antenna tilt angle $\theta$;
Receive an altitude A, where A is the altitude of the airborne measuring station above ground level;
Determine a far projection angle $\Delta$f being based upon the signal strength on the ground being a predetermined fraction of the maximum signal strength on the ground, being based upon the beam width $2\phi$ and tilt angle $\theta$;
Determine a near projection angle $\Delta$n being based upon the signal strength on the ground being a predetermined fraction of the maximum signal strength on the ground, being based upon the beam width $2\phi$ and tilt angle $\theta$;
Determine a far projection range, Rf, corresponding to the far projection angle $\Delta$f and based upon the values of $\Delta$f and A;
Determine a near projection range, Rn, corresponding to the near projection angle $\Delta$n and based upon the values of $\Delta$n and A;
Determine an end time of a reception window based upon the value of the far projection range, Rf;
Determine a start time of a reception window based upon the value of the near projection range, Rn;

Example 14. The method of Example 13, wherein the far projection angle $\Delta$f is determined from the formula:

$(\sin^2)\cos^N(\psi))/(\sin^2(\theta+\psi\max)\cos^N(\psi\max))=$Fraction

Where ($\theta+\psi$) is the pitch angle
($\theta+\psi$max) is the pitch angle of the maximum antenna gain on the ground
$\cos^N$ (x) is the antennal gain at angle x
Fraction is a predetermined fraction Example 15. The method of Example 13, wherein the near projection angle $\Delta$n is determined from the formula:

$(\sin^2(\Delta n)\cos^N(\psi))/(\sin^2(\theta+\psi\max)\cos^N(\psi\max))=$Fraction Where ($\theta+\psi$) is the pitch angle
($\theta+\psi$max) is the pitch angle of the maximum antenna gain on the ground
$\cos^N$ (x) is the antennal gain at angle x
Fraction is a predetermined fraction Example 16. The method of Example 13, wherein the predetermined fraction of the maximum signal strength on the ground, for the far and near projections, is 1/15.8.

Example 17 The method of Example 16, wherein the far projection angle $\Delta$f is determined as:

$\Delta f = (-14.83 + 1.08\Phi - 0.013\Phi^2) + (1.11 - 0.061\Phi + 0.00085\Phi^2)\theta + (0.00069 + 0.00028\Phi - 0.0000057\Phi^2)\theta^2$ Example 18. The method of Example 16, wherein the near projection angle $\Delta$n is determined as:

$\Delta n = (-6.35 + 3\Delta 8\Phi - 0.034\Phi^2) + (1.04 - 0.019\Phi + 0.0004\Phi^2)\theta + (0.000156 + 0.000062\Phi - 0.0000027\Phi^2)\theta^2$ Example 19. The method of Example 13 where the far projection range Rf is determined as:

$$R_f = \begin{cases} \Delta_f = 0°, R_{fmax} \\ \dfrac{A}{\sin(\Delta_f)} > R_{fmax}, R_{fmax} \\ \dfrac{A}{\sin(\Delta_f)} \end{cases}$$

$$\text{Where } \Delta_f = \begin{cases} \Delta_f < 0°, 0° \\ \Delta_f < \theta, \theta \end{cases}$$

Where Rfmax is a maximum value for Rf derived from the time between successive transmitted ranging packets
A is altitude of airborne measuring station above ground Example 20. The method of Example 13 where the near projection range Rn is determined as:

$$R_n = \begin{cases} \Delta_n > 90°, A \\ \dfrac{A}{\sin(\Delta_n)} \end{cases}$$

Where A is altitude of airborne measuring station above ground

Example 21. The method of Example 13 where the reception window end time Tt, is determined as:

$$T_t = \begin{cases} \Delta_f = 0°, T_{tmax} \\ \dfrac{2R_f}{c} + t_{SIFS} > T_{tmax}, T_{tmax} \\ \dfrac{2R_f}{c} + t_{SIFS} \end{cases}$$

-continued $$\text{Where } \Delta_f = \begin{cases} \Delta_f < 0°, 0° \\ \Delta_f < \theta, \theta \end{cases}$$

Rf=A/sin (Δf)
c=speed of light
$T_{tmax}$ is a maximum value for Tt derived from the time between successive transmitted ranging packets
$t_{SIFS}$ is the short interframe spacing time Example 22. The method of Example 13 where the reception window start time Ts, is determined as:

$$T_s = \begin{cases} \Delta_n > 90°, \dfrac{2A}{c} + t_{SIFS} \\ \dfrac{2R_n}{c} + t_{SIFS} \end{cases}$$

Where Rn=A/sin (tin)
c=speed of light
$t_{SIFS}$ is the short interframe spacing time Example 23. An airborne station, comprising:
A transmitter/receiver, processing circuitry and a directional antenna configured to:
  Receive an antenna beam width 2φ;
  Receive an antenna tilt angle θ;
  Receive an altitude A, where A is the altitude of the airborne measuring station above ground level;
  Determine a far projection angle Δf being based upon the signal strength on the ground being a predetermined fraction of the maximum signal strength on the ground, being based upon the beam width 2φ and tilt angle θ;
  Determine a near projection angle Δn being based upon the signal strength on the ground being a predetermined fraction of the maximum signal strength on the ground, being based upon the beam width 2φ and tilt angle θ;
  Determine a far projection range, Rf, corresponding to the far projection angle Δf and based upon the values of Δf and A;
  Determine a near projection range, Rn, corresponding to the near projection angle Δn and based upon the values of Δn and A;
  Determine an end time of a reception window based upon the value of the far projection range, Rf; and
  Determine a start time of a reception window based upon the value of the near projection range, Rn.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the predetermined fraction for the near and far relative ground signal strengths to the maximum ground signal strength, the approximation formulas for the estimates for the values of the near and far antenna projection angles, an allowance for variations in SIFS, the details of the gimballed antenna hardware. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for determining reception window timing using a measuring station, the measuring station comprising a directional antenna having a boresight, the measuring station transmitting signals to a target station, the measuring station receiving response signals from the target station corresponding to the transmitted signals, the method further comprising:
   receiving an antenna beam width 2Φ;
   receiving an antenna tilt angle θ;
   receiving an altitude A, where A is an altitude of the measuring station above ground level;
   determining a far projection angle Δf based at least upon a far signal strength at ground level, the far signal strength being a far predetermined fraction of a maximum signal strength at ground level, the far predetermined fraction being based at least in part upon the beam width 2Φ and tilt angle θ;
   determining a near projection angle Δn based at least upon a near signal strength at ground level, the near signal strength being a near predetermined fraction of the maximum signal strength at ground level, the near predetermined fraction being based upon the beam width 2Φ and tilt angle θ;
   determining a far projection range, Rf, corresponding to the far projection angle Δf and based at least upon the values of Δf and A;
   determining a near projection range, Rn, corresponding to the near projection angle Δn and based at least upon the values of Δn and A;
   determining an end time of a reception window, Tt, based at least upon the value of the far projection range, Rf, the reception window being a window of time in which a response from the target station is expected to be received; and
   determining a start time of the reception window based at least upon the value of the near projection range, Rn.

2. The method of claim 1, wherein the far projection angle Δf is determined from a formula given by:

$$(\sin^2(\Delta f)\cos^N(\psi))/(\sin^2(\theta+\psi max)\cos^N(\psi max))=\text{Fraction},$$

(ψ) being a deviation in degrees from the boresight of the directional antenna,
   (ψmax) being a deviation from the boresight of the directional antenna that corresponds to a maximum gain at the ground level,
   (θ+ψ) being a pitch angle,
   (θ+ψmax) being the pitch angle of the maximum antenna gain at the ground level,
   $\cos^N(x)$ being an antenna gain at angle x, x being an angle from one of a center of the directional antenna and the boresight of the directional antenna, and
   Fraction being a predetermined fraction.

3. The method of claim 1, wherein the near projection angle Δn is determined from a formula given by:

$$(\sin^2(\Delta n)\cos^N(\psi))/(\sin^2(\theta+\psi max)\cos^N(\psi max))=\text{Fraction},$$

(ψ) being a deviation in degrees from the boresight of the directional antenna,
   (ψmax) being a deviation from the boresight of the directional antenna that corresponds to a maximum gain at the ground level,
   (θ+ψ) being a pitch angle,
   (θ+ψmax) being the pitch angle of the maximum antenna gain at the ground level,
   $\cos^N(x)$ being an antenna gain at angle x, x being an angle from one of a center of the directional antenna and the boresight of the directional antenna, and
   Fraction being a predetermined fraction.

4. The method of claim 1, wherein the near predetermined fraction of the maximum signal strength at the ground level is 1/15.8, and the far predetermined fraction of the maximum signal strength at the ground level is 1/15.8.

5. The method of claim 4, wherein the far projection angle Δf is determined as:

$$\Delta f=(-14.83+1.08\Phi-0.013\Phi^2)+(1.11-0.061\Phi+0.000085\Phi^2)\theta+(0.00069+0.00028\Phi-0.0000057\Phi^2)\theta^2,$$

2Φ being a beam width of the directional antenna.

6. The method of claim 4, wherein the near projection angle Δn is determined as:

$$\Delta n=(-6.35+3\Delta 8\Phi-0.034\Phi^2)+(1.04-0.019\Phi+0.0004\Phi^2)\theta+(0.000156+0.000062\Phi-0.0000027\Phi^2)\theta^2,$$

2Φ being a beam width of the directional antenna.

7. The method of claim 1, wherein the far projection range Rf is determined as:

$$R_f = \begin{cases} \Delta_f = 0°, R_{fmax} \\ \dfrac{A}{\sin(\Delta_f)} > R_{fmax}, R_{fmax} \\ \dfrac{A}{\sin(\Delta_f)} \end{cases},$$

$$\text{Where } \Delta_f = \begin{cases} \Delta_f < 0°, 0° \\ \Delta_f < \theta, \theta \end{cases},$$

Rfmax being a maximum value for Rf derived from the time between successive transmitted ranging packets.

8. The method of claim 1, wherein the near projection range Rn is determined as:

$$R_n = \begin{cases} \Delta_n > 90°, A \\ \dfrac{A}{\sin(\Delta_n)} \end{cases}.$$

9. The method of claim 1, wherein the reception window end time Tt is determined as:

$$T_t = \begin{cases} \Delta_f = 0°, T_{tmax} \\ \dfrac{2R_f}{c} + t_{SIFS} > T_{tmax}, T_{tmax} \\ \dfrac{2R_f}{c} + t_{SIFS} \end{cases},$$

$$\text{Where } \Delta_f = \begin{cases} \Delta_f < 0°, 0° \\ \Delta_f < \theta, \theta \end{cases},$$

Rf=A/sin(Δf),
   c=speed of light, $T_{max}$ being a maximum value for Tt derived from a time between successive transmitted ranging packets, and
$t_{SIFS}$ being a short interframe spacing time.

10. The method of claim 9, wherein the maximum value for the reception window end time, $T_{tmax}$ is determined as:

$$T_{tmax} = (Tp - tp - tr)$$

Tp being the time between transmitted request packets,
tp being the duration of the request packet, and
tr is the duration of the response packet.

11. The method of claim 7, wherein a maximum value of the far projection range, Rfmax, is determined as:

$$Rf\,max = c(Tt\,max - t_{SIFS})/2$$

where c=speed of light,
$T_{tmax}$ being a maximum value for Tt, and
$t_{SIFS}$ being the short interframe spacing time.

12. The method of claim 1, wherein a reception window start time Ts, is determined as:

$$T_s = \begin{cases} \Delta_n > 90°, \dfrac{2A}{c} + t_{SIFS} \\ \dfrac{2R_n}{c} + t_{SIFS} \end{cases},$$

where Rn=A/sin (Δn),
c=speed of light, and
$t_{SIFS}$ being the short interframe spacing time.

13. An apparatus for determining reception window timing using a measuring station, the measuring station comprising a directional antenna having a boresight, the measuring station transmitting signals to a target station, the measuring station receiving response signals from the target station corresponding to the transmitted signals, the apparatus comprising:
  processing circuitry in communication with the apparatus, the processing circuitry configured to:
    receive an antenna beam width 2Φ;
    receive an antenna tilt angle θ;
    receive an altitude A, where A is the altitude of the measuring station above ground level;
    determine a far projection angle Δf based at least upon a far signal strength at ground level, the far signal strength being a far predetermined fraction of a maximum signal strength at ground level, the far predetermined fraction being based at least in part upon the beam width 2Φ and tilt angle θ;
    determine a near projection angle Δn based at least upon a near signal strength at ground level, the near signal strength being a near predetermined fraction of the maximum signal strength at ground level, the near predetermined fraction being based upon the beam width 2Φ and tilt angle θ;
    determine a far projection range, Rf, corresponding to the far projection angle Δf and based upon the values of Δf and A;
    determine a near projection range, Rn, corresponding to the near projection angle Δn and based at least upon the values of Δn and A; and
    determine an end time of a reception window, Tt, based at least upon the value of the far projection range, Rf, the reception window being a window of time in which a response from the target station is expected to be received; and
    determine a start time of the reception window based at least upon the value of the near projection range, Rn.

14. The apparatus of claim 13, wherein the far projection angle Δf is determined from the formula:

$$(\sin^2(\Delta f)\cos^N(\psi))/(\sin^2(\theta+\psi max)\cos^N(\psi max)) = \text{Fraction},$$

(ψ) being a deviation in degrees from the boresight of the directional antenna,
(ψmax) being a deviation from the boresight of the directional antenna that corresponds to a maximum gain at the ground level,
(θ+ψ) being a pitch angle,
(θ+ψmax) being the pitch angle of the maximum antenna gain at the ground level, and
$\cos^N(x)$ being an antenna gain at angle x, x being an angle from one of a center of the directional antenna and the boresight of the directional antenna, and
Fraction being a predetermined fraction.

15. The first wireless device of claim 13, wherein the near projection angle Δn is determined from the formula:

$$(\sin^2(\Delta n)\cos^N(\psi))/(\sin^2(\theta+\psi max)\cos^N(\psi max)) = \text{Fraction},$$

(ψ) being a deviation in degrees from the boresight of the directional antenna,
(ψmax) being a deviation from the boresight of the directional antenna that corresponds to a maximum gain at the ground level,
(θ+ψ) being a pitch angle,
(θ+ψmax) being the pitch angle of the maximum antenna gain at the ground level,
$\cos^N(x)$ being an antenna gain at angle x, x being an angle from one of a center of the directional antenna and the boresight of the directional antenna, and
Fraction being a predetermined fraction.

16. The apparatus of claim 13, wherein the near predetermined fraction of the maximum signal strength at the ground level is 1/15.8, and the far predetermined fraction of the maximum signal strength at the ground level is 1/15.8.

17. The apparatus of claim 16, wherein the far projection angle Δf is determined as:

$$\Delta f = (-14.83 + 1.08\Phi - 0.013\Phi^2) + (1.11 - 0.061\Phi + 0.00085\Phi^2)\theta + (0.00069 + 0.00028\Phi - 0.0000057\Phi^2)\theta^2,$$

2Φ being a beam width of the directional antenna.

18. The apparatus of claim 16, wherein the near projection angle Δn is determined as:

$$\Delta n = (-6.35 + 3\Delta 8\Phi - 0.034\Phi^2) + (1.04 - 0.019\Phi + 0.0004\Phi^2)\theta + (0.000156 + 0.000062\Phi - 0.0000027\Phi^2)\theta^2,$$

2Φ being a beam width of the directional antenna.

19. The apparatus of claim 13, wherein the far projection range Rf is determined as:

$$R_f = \begin{cases} \Delta_f = 0°, R_{fmax} \\ \dfrac{A}{\sin(\Delta_f)} > R_{fmax}, R_{fmax} \\ \dfrac{A}{\sin(\Delta_f)} \end{cases}$$

Where $\Delta_f = \begin{cases} \Delta_f < 0°, 0° \\ \Delta_f < \theta, \theta \end{cases},$ Rfmax being a maximum value for Rf derived from the time between successive transmitted ranging packets.

20. The apparatus of claim 13, wherein the near projection range Rn is determined as:

$$R_n = \begin{cases} \Delta_n > 90°, A \\ \dfrac{A}{\sin(\Delta_n)} \end{cases}.$$

21. The apparatus of claim 13, wherein the reception window end time Tt, is determined as:

$$T_t = \begin{cases} \Delta_f = 0°, T_{tmax} \\ \dfrac{2R_f}{c} + t_{SIFS} > T_{tmax}, T_{tmax} \\ \dfrac{2R_f}{c} + t_{SIFS} \end{cases},$$

Where $\Delta_f = \begin{cases} \Delta_f < 0°, 0° \\ \Delta_f < \theta, \theta \end{cases}$, Rf=A/sin(Δ),
c=speed of light,
$T_{max}$ being a maximum value for Tt derived from a time between successive transmitted ranging packets, and
$t_{SIFS}$ being a short interframe spacing time.

22. The apparatus of claim 13, wherein the reception window start time Ts, is determined as:

$$T_s = \begin{cases} \Delta_n > 90°, \dfrac{2A}{c} + t_{SIFS} \\ \dfrac{2R_n}{c} + t_{SIFS} \end{cases},$$

where Rn=A/sin (Δn),
c=speed of light, and
$t_{SIFS}$ being the short interframe spacing time.

23. A measuring station for determining reception window timing, the measuring station comprising a directional antenna in communication with a transmitter receiver, the measuring station comprising:
the transmitter receiver configured to:
transmit radio frequency (RF) signals, including RF signals to a target station;
receive RF signals, including RF signals from a target station corresponding to the transmitted RF signals;
a processing circuitry configured to:
receive an antenna beam width 2Φ;
receive an antenna tilt angle θ;
receive an altitude A, where A is the altitude of the measuring station above ground level;
determine a far projection angle Δf based at least upon a far signal strength at ground level, the far signal strength being a far predetermined fraction of a maximum signal strength at ground level, the far predetermined fraction being based at least in part upon the beam width 2Φ and tilt angle θ;
determine a near projection angle Δn based at least upon a near signal strength at ground level, the near signal strength being a near predetermined fraction of the maximum signal strength at ground level, the near predetermined fraction being based upon the beam width 2Φ and tilt angle θ;
determine a far projection range, Rf, corresponding to the far projection angle Δf and based at least upon the values of Δf and A;
determine a near projection range, Rn, corresponding to the near projection angle Δn and based at least upon the values of Δn and A;
determine an end time of a reception window, Tt, based at least upon the value of the far projection range, Rf, the reception window being a window of time in which a response from the target station is expected to be received; and
determine a start time of the reception window based at least upon the value of the near projection range, Rn.

* * * * *